United States Patent [19]
Moreland

[11] Patent Number: 5,893,180
[45] Date of Patent: Apr. 13, 1999

[54] METHOD AND APPARATUS FOR PROVIDING A PULSED WATER MASSAGE

[76] Inventor: Gerald W. Moreland, 4116 East Rolling Green La., Orange, Calif. 92867

[*] Notice: This patent is subject to a terminal disclaimer.

[21] Appl. No.: 08/819,666

[22] Filed: Mar. 12, 1997

Related U.S. Application Data

[63] Continuation-in-part of application No. 08/302,207, Sep. 8, 1994.

[51] Int. Cl.$^6$ ............................................. A61H 33/02
[52] U.S. Cl. ................................................. 4/541.1
[58] Field of Search ........................ 4/492, 541.1, 541.6

[56] References Cited

U.S. PATENT DOCUMENTS

| | | | |
|---|---|---|---|
| 2,081,510 | 5/1937 | Smart | 137/624.14 |
| 2,100,154 | 11/1937 | Ashton | 137/624.13 |
| 2,302,061 | 11/1942 | Schirm | 137/624.13 |
| 3,307,579 | 3/1967 | Beddoes | 137/624.18 |
| 3,730,208 | 5/1973 | Lewis | 137/119 |
| 4,592,379 | 6/1986 | Goettl | 137/119 |
| 4,655,252 | 4/1987 | Krumhansl | 137/595 |
| 4,751,919 | 6/1988 | Thomsen | 601/156 |
| 4,817,656 | 4/1989 | Gould | 137/2 |
| 4,908,016 | 3/1990 | Thomsen | 601/156 |
| 4,989,641 | 2/1991 | Jones et al. | 137/625.11 |
| 5,003,646 | 4/1991 | Stamp et al. | 4/541.6 |
| 5,158,076 | 10/1992 | Thomsen | 601/156 |
| 5,548,854 | 8/1996 | Bloemer et al. | 4/541.6 |

*Primary Examiner*—Robert M. Fetsuga
*Attorney, Agent, or Firm*—Knobbe, Martens, Olson & Bear, LLP

[57] ABSTRACT

A pulsing valve for routing water flow from an inlet line to outlet lines connected to water jets arranged in an array to massage an occupant of a whirlpool spa or bathtub is provided. The pulsing valve includes a water turbine driving a selector disk through a reduction gear drive. The selector disk contains openings which oppose individual outlet water lines and direct water flow to them. Rotation of the selector disk switches or cycles pressurized water flow among the individual outlet water lines, causing the massaging water jet location to move, improving the quality of the resulting massage. The speed of the cycling of the water can be changed by changing the pressure of the water delivered to the water turbine. Additionally, the water turbine can be powered by tap water instead of pressurized water and the valve can be used to cycle tap water to the individual jets instead of cycling pressurized water. The pulsing valve can be used to cycle air to the individual jets instead of cycling pressurized water. Finally, a selector on the valve is used to control the flow of water through the valve outlets, the selector initiating flow of water through the outlets at a different rate than the selector terminates the flow of water through the outlets.

11 Claims, 22 Drawing Sheets

Fig. 3
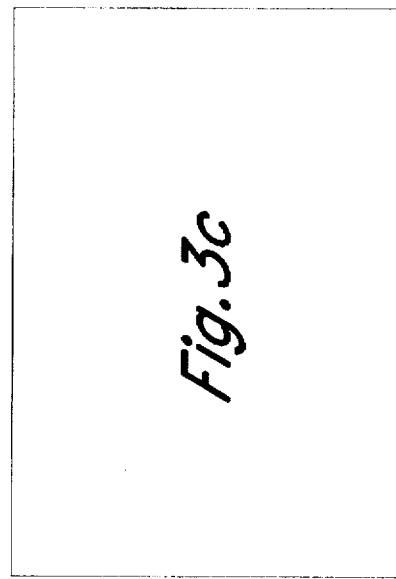
Fig. 3c
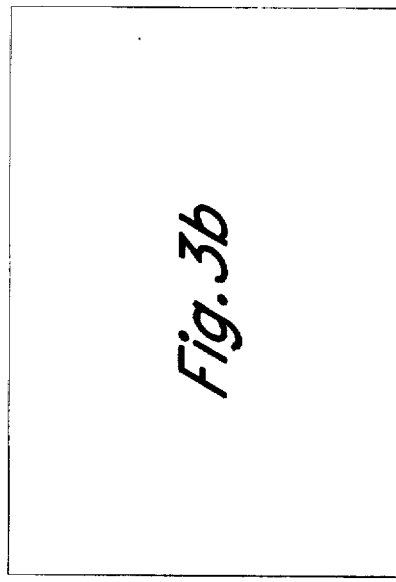
Fig. 3b
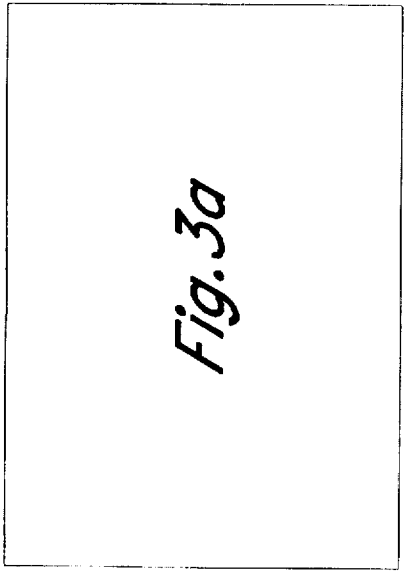
Fig. 3a

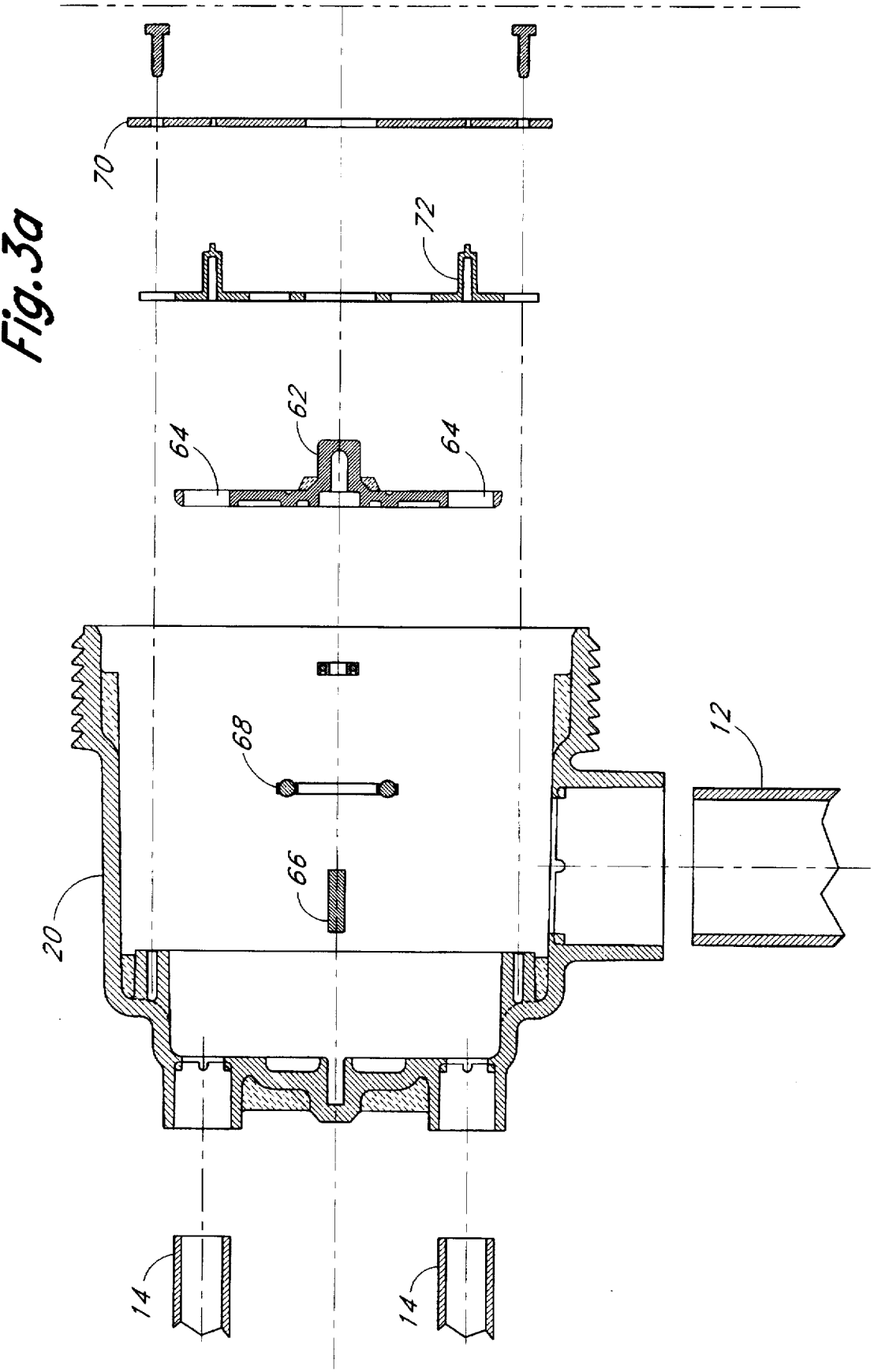

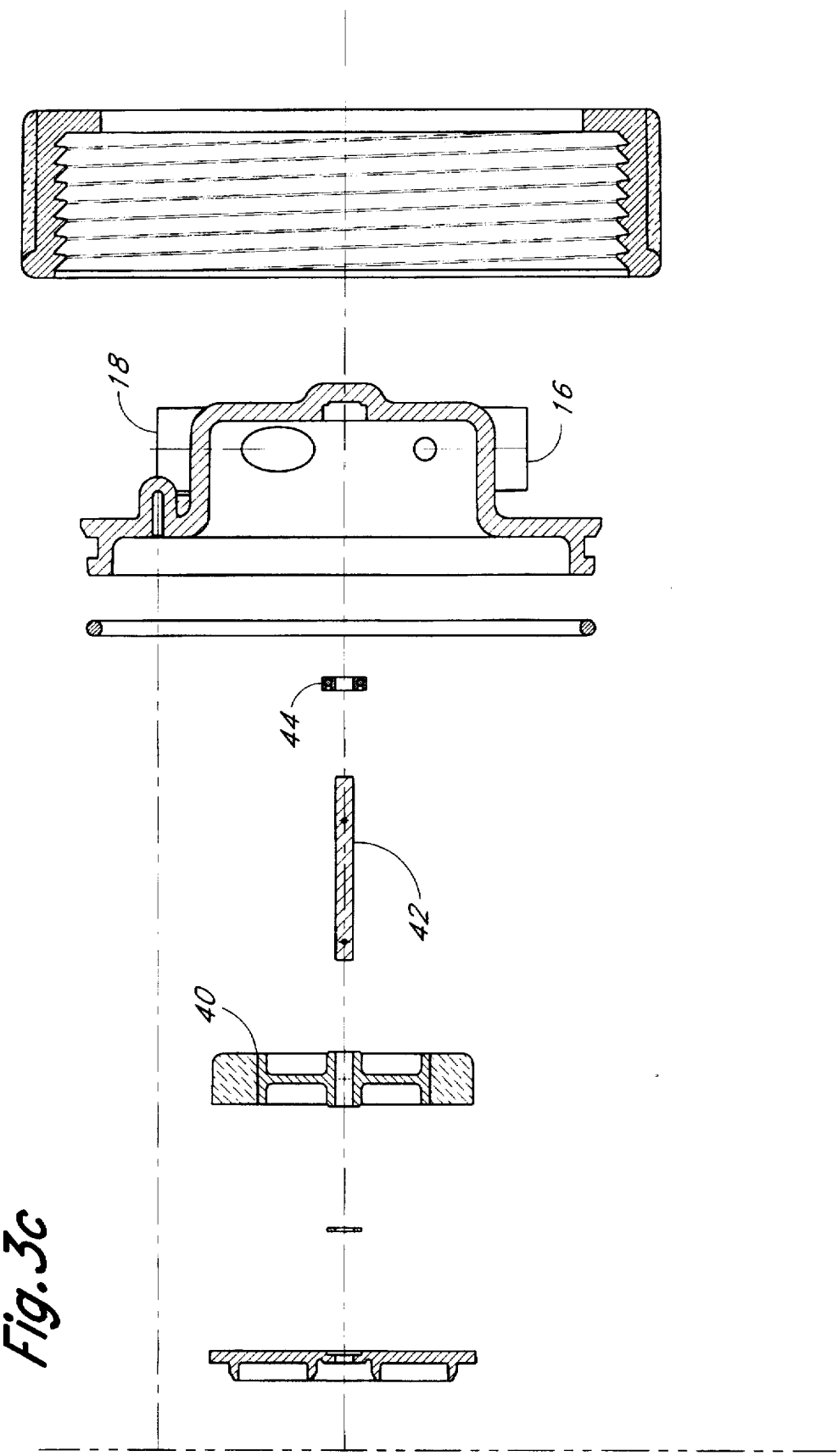

METHOD AND APPARATUS FOR PROVIDING A PULSED WATER MASSAGE

RELATED APPLICATIONS

This application is a continuation-in-part of application Ser. No. 08/302,207, filed Sep. 8, 1994.

BACKGROUND OF THE INVENTION

1. Field of the Invention

The present invention relates to rotary pulsing valves for whirlpool spas and to a method for providing a pulsed massage to a user.

2. Background of the Invention

Whirlpool spas or jacuzzi typically contain one or more wall-mounted water jets for massaging an occupant of the spa. A more effective massage may be provided if several jets are located near each other in a cluster and the water flow is sequentially switched between individual jets in the cluster. This switching may be accomplished by a multiplexing or pulsing valve.

One such valve has been sold under the name CYCLE-JET. The CYCLE-JET valve includes a turbine wheel driven by water flow from the valve inlet. The turbines wheel contains a number of openings which shunt water to output openings of the valve connected to the individual water jets. As the turbine wheel rotates, the openings in the turbine wheel align themselves with individual openings in the valve which are connected to the output openings, thereby allowing water to flow from the valve inlet into one of the outlet openings at a time. Rotation of the turbine results in the selection of different output openings, and therefore different water jets. The valve therefore allows the location of water flow to move about within the cluster of water jets rather than being fixed at a single location. This feature allows the water jets to massage a larger area of the spa occupant's body.

Although it allows movement of the massaging water jet, the CYCLE-JET valve suffers from operational difficulties. Rotation of the CYCLE-JET's turbine wheel is easily impeded by the accumulation of small grains of sand or grit between the turbine wheel and the valve housing. Such accumulations of small amounts of contaminants cause the turbine wheel to seize, thereby halting the valve's switching operation. Because the CYCLE-JET is typically mounted in the ground near the whirlpool, removing sand accumulations from a seized valve is often a difficult task.

Additionally, the CYCLE-JET does not allow its user to independently vary the speed of switching and force of water emitted from the jets because water flow from the valve inlet also drives the switching mechanism. Output water pressure and switching speed are therefore inextricably related to each other and may not be varied independently.

Consequently, a reliable pulsing valve which sequentially switches an inlet water stream among individual jets for massaging the occupant of a whirlpool is desirable.

SUMMARY OF THE INVENTION

In accordance with the present invention, a rotary pulsing valve is provided in a massaging system for directing water flow from a wall of a whirlpool to massage a selected part of a whirlpool occupant's body. The massaging system includes a closely-spaced array of water jets mounted in the wall of the whirlpool. The configuration of the jet array is chosen to match the dimensions of the selected part of the occupant's body to allow the water jets to massage the selected part of the occupant.

The massaging system also includes a distributing valve connected to the array of water jets for sequentially routing the water flow through the water jets. The distributing valve has an inlet portion, a selector disc, a first drive shaft, a reduction gear drive, a second drive shaft, a water turbine, and a plurality of outlets. The first drive shaft is driven by the water turbine and is connected to the reduction gear drive. The second drive shaft is connected to the output of the reduction gear drive and drives the selector disc. The selector disc sequentially distributes the water flow through each of the outlets, which are connected to the water jets. In one embodiment of the present invention, the reduction gear drive is a Geneva drive.

In one embodiment of the invention, the selector disk comprises a central plate, a plurality of tabs, or wipers, extending radially outwardly from the plate which are evenly spaced around the circumference of the plate and a plurality of arc-shaped wipers. The first end of each of the wipers are attached to one of the plurality of tabs such that a second end of each of the wipers is spaced from the next tab around the circumference of the plate, thus forming an opening between the second end of the wipers and the next tab around the circumference of the plate. Preferably, the wipers require are made of a flexible plastic material and therefore require less clearance between the selector disk and the discharge openings than an all aluminum embodiment. The reduced clearance between the selector disk and the discharge openings results in decreased leak-by, i.e., leakage around the selector disk that was caused by the previously larger clearance. In addition, the force of the water flowing through the valve presses the flexible wipers against the closed discharge ports thereby forming a tighter seal against the closed ports and enables more efficient use of the water being delivered to the unit. Preferably, the discharge ports in the selector disk are energized such that the number of discharge ports that are open at the same time is not equal to half the number of discharge ports. This configuration reduces the internal pressure spikes that occur when the valve cycles from one outlet to another, further achieving smoother operation of the valve.

According to another aspect of the present invention, an apparatus for massaging a body part of an occupant of a whirlpool spa is provided. The apparatus includes a rectangular array of water jets mounted in the wall of the whirlpool for sequentially supplying streams of high-pressure water to the body part of the occupant or user. The length and width of the array are chosen to match the dimensions of the body part. The apparatus also includes a multiplexing valve connected to the array of water jets for sequentially directing water flow through the jets, the multiplexing valve being driven by a water turbine through a reduction gear assembly.

According to yet another aspect of the present invention, the reduction gear assembly further includes a first water inlet for supplying water to the water turbine, a plurality of outlets connected to the water jets, a second water inlet for supplying water to the outlets, and an output shaft connected to and driven by the water turbine. The output shaft is connected to the reduction gear assembly. The reduction gear assembly also includes a drive shaft connected thereto and driven by the output shaft at a lower angular speed than the output shaft and a selector disk connected to the drive shaft and containing at least one opening. The opening allows water from the second water inlet to pass into a selected one of the outlets.

The reduction gear assembly included in the pulsing valve of the present invention is advantageously resistant to sand accumulation and therefore solves the problem of jamming which plagued the prior-art CYCLE-JET valve. The pulsing valve of the present invention may also be adapted to feed as many water jets as desired. The switching speed of the valve of the present invention may advantageously be controlled independently of the water pressure delivered from the outlets through the placement of a valve in the turbine water inlet.

According to yet another aspect of the present invention, the speed of the cycling operation is controlled by inserting a valve before the inlet of the turbine, the valve allows the user to meter the flow of the water applied to the turbine which enables the spa occupant to control the switching speed of the turbine which changes the speed the water is cycled through the jets without changing the water pressure applied to the jets.

According to yet another aspect of the present invention, the multiplexing valve is adapted such that the second water inlet is replaced by an air inlet that is connected to an air supply such that the cycle valve is cycling the air supplied to the jets and not the water. Water is supplied to the jets by a pressurized water source which is set to a constant flow position. The cycle valve cycles the air supplied to each of the jets to provided the user with a pulsating water/air mixture from each jet.

According to yet another aspect of the present invention, instead of supplying pressurized water to the valve, the rotary pulsing valve is powered by tap water and the water delivered to main water inlet of the valve that cycled by the valve and delivered to the jets is also tap water. This embodiment is advantageous for use in a shower or bathtub where a pressurized water supply may not be available.

BRIEF DESCRIPTION OF THE DRAWINGS

FIG. 3 is an illustration of the relationship between FIGS. 3a, 3b, and 3c illustrating one embodiment of the pulsing valve of the present invention.

FIG. 3a is an expanded, exploded cross-sectional view of a portion of the pulsing valve depicted in FIG. 3.

FIG. 3c is an expanded, exploded cross-sectional view of a portion of the pulsing valve depicted in FIG. 3.

DETAILED DESCRIPTION OF THE PREFERRED EMBODIMENTS

Figure 1:
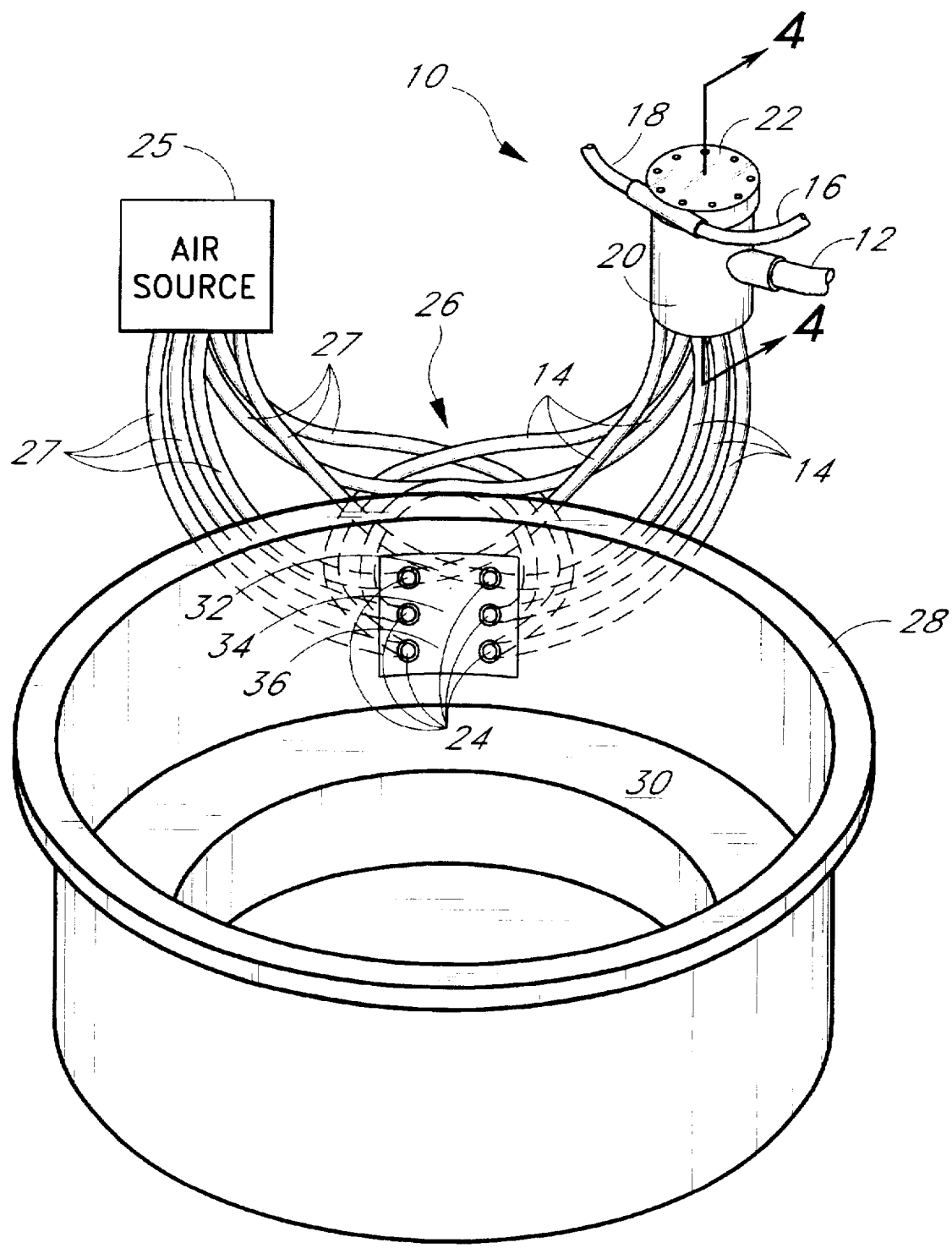
FIG. 1 illustrates generally the pulsing valve of the present invention and its operating environment.
Figure 4:
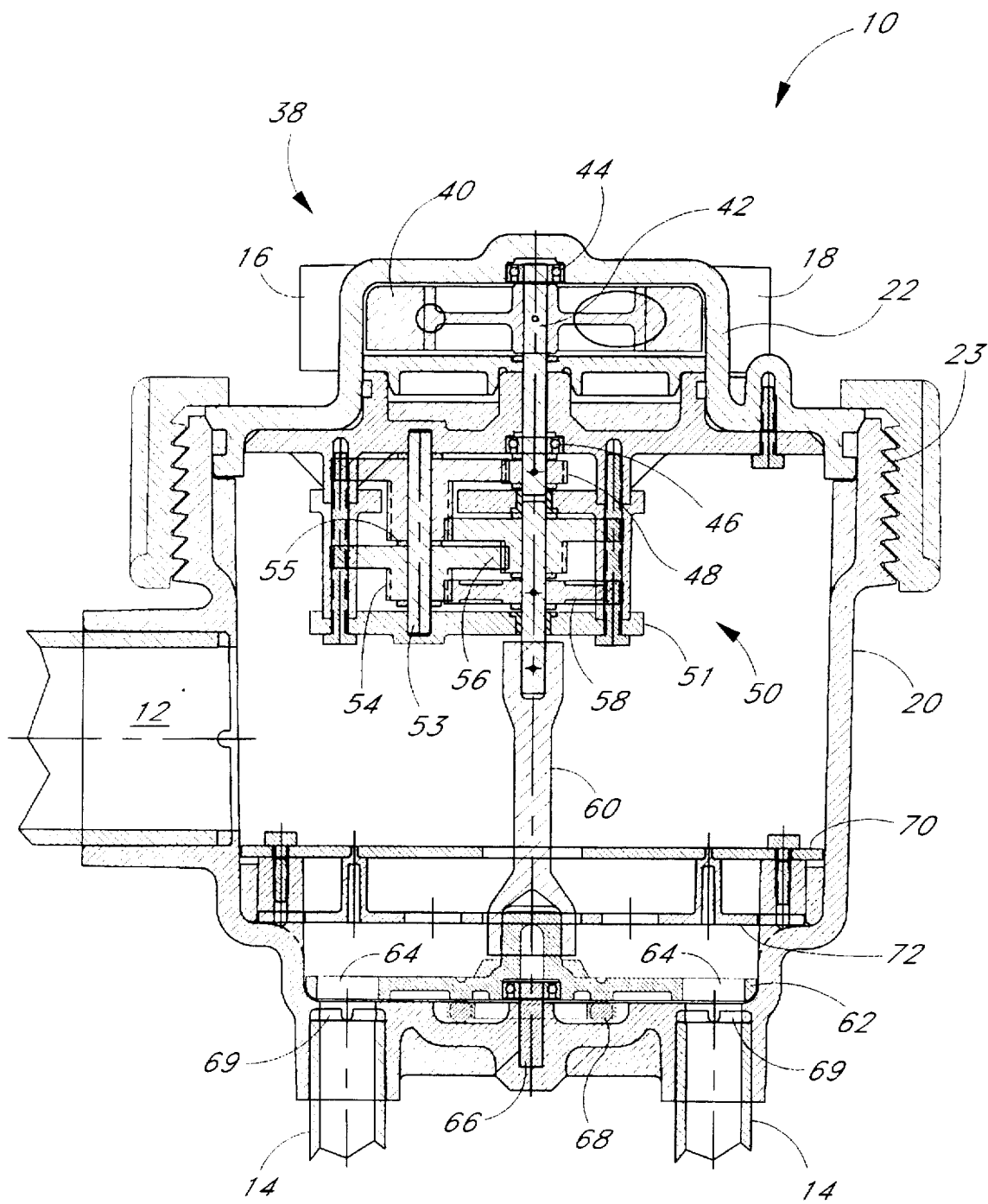
FIG. 4 is an assembled cross-sectional view of the embodiment of FIG. 3.

Referring to the drawings, FIG. 1 illustrates a rotary pulsing valve 10. The valve 10 includes an inlet line 12, a plurality of outlet lines 14, a water turbine inlet line 16, and a water turbine exhaust line 18. The valve body includes a base 20 and a top 22 connectable to the base by threads 23 (FIG. 4). The valve outlets 14 are each connected to lines which feed a plurality of water jets 24 located in a cluster 26 in a wall of a whirlpool 28.

In operation, water supplied by a pressurized water source 43 (FIG. 2.) flows through the valve inlet 12 into the valve base 20, where it is directed by the valve into one or more of the outlet lines 14. The water from each of the outlet lines 14 is mixed with air from an air source 25 that is delivered by a plurality of air delivery lines 27 to each of the water jets 24 and is sent into the whirlpool 28 as a water/air mixture.

In the embodiment illustrated in FIG. 1, the jets 24 are arranged in a rectangular array and six jets are provided in three rows of two jets apiece. In this embodiment, the occupant of the spa 28 sits on a bench 30 in the whirlpool and situates himself so that his back faces the array or cluster 26 of jets 24 so that each column of jets can massage one side of the occupant's back. The pulsing valve 10 sequentially directs the jets' water flow so that the occupant's back is massaged by each row of jets from top to bottom. It achieves this object by first directing water flow into a top row 32 of jets. After the passage of a preset time interval, the valve 10 switches water flow from the top row 32 to a middle row 34 of jets. After the passage of another preset time interval, the valve 10 switches water flow from the middle row 34 to a bottom row 36 of jets 24. The cycle is repeated when the valve switches water flow from the bottom row 36 back to the top row 32 of water jets. While only six jets are shown in FIG. 1, it should be understood that the present invention can operate with more than six jets or less than six jets as necessary, depending on the type of massage for which the spa 28 is configured. Furthermore, the plumbing connections between the jets 24 and the rotary pulsing valve 10 can be made in virtually any configuration to provide virtually any sequence of jet operation.

Figure 2:
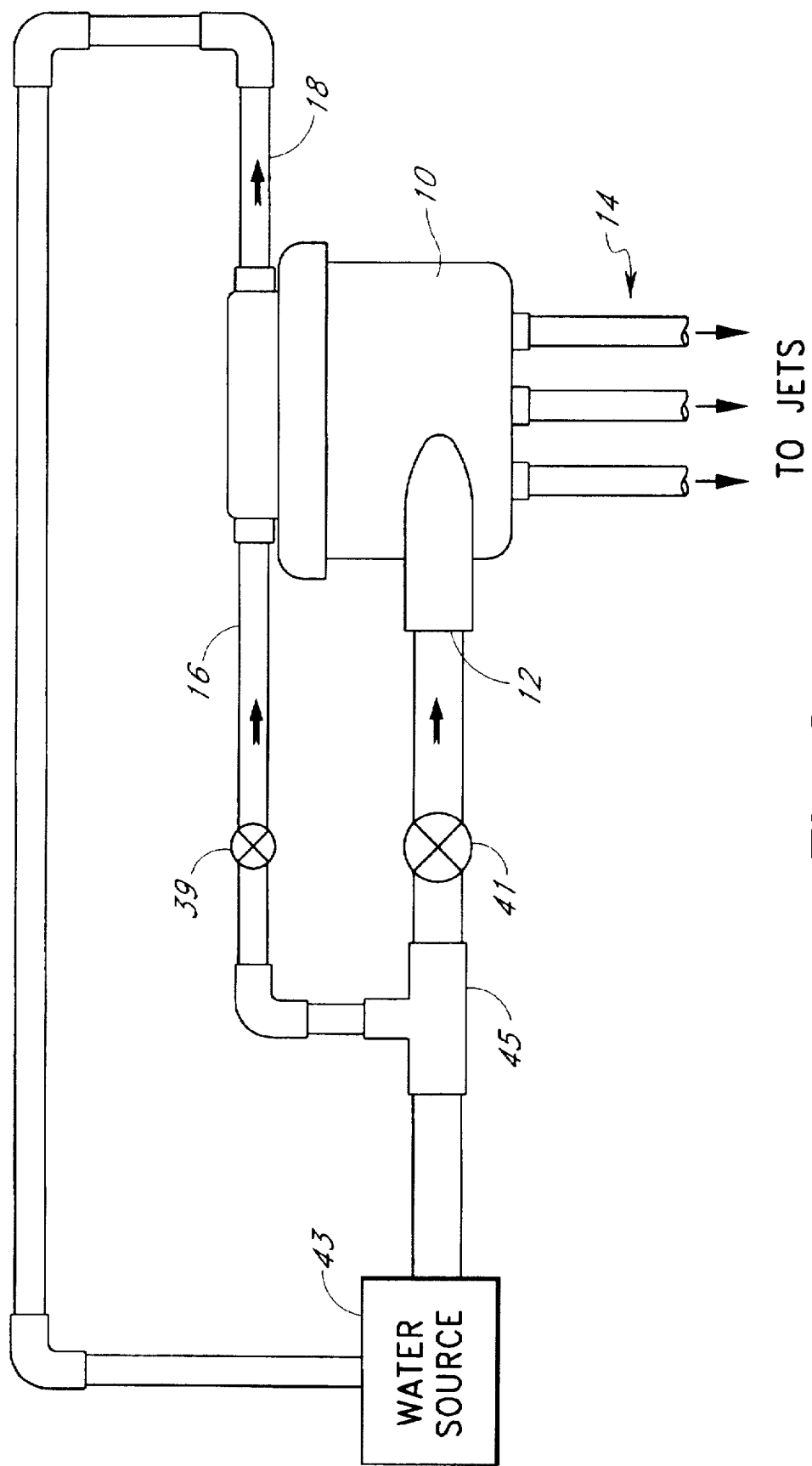
FIG. 2 illustrates generally the operating environment of the pulsing valve.
Figure 3B:
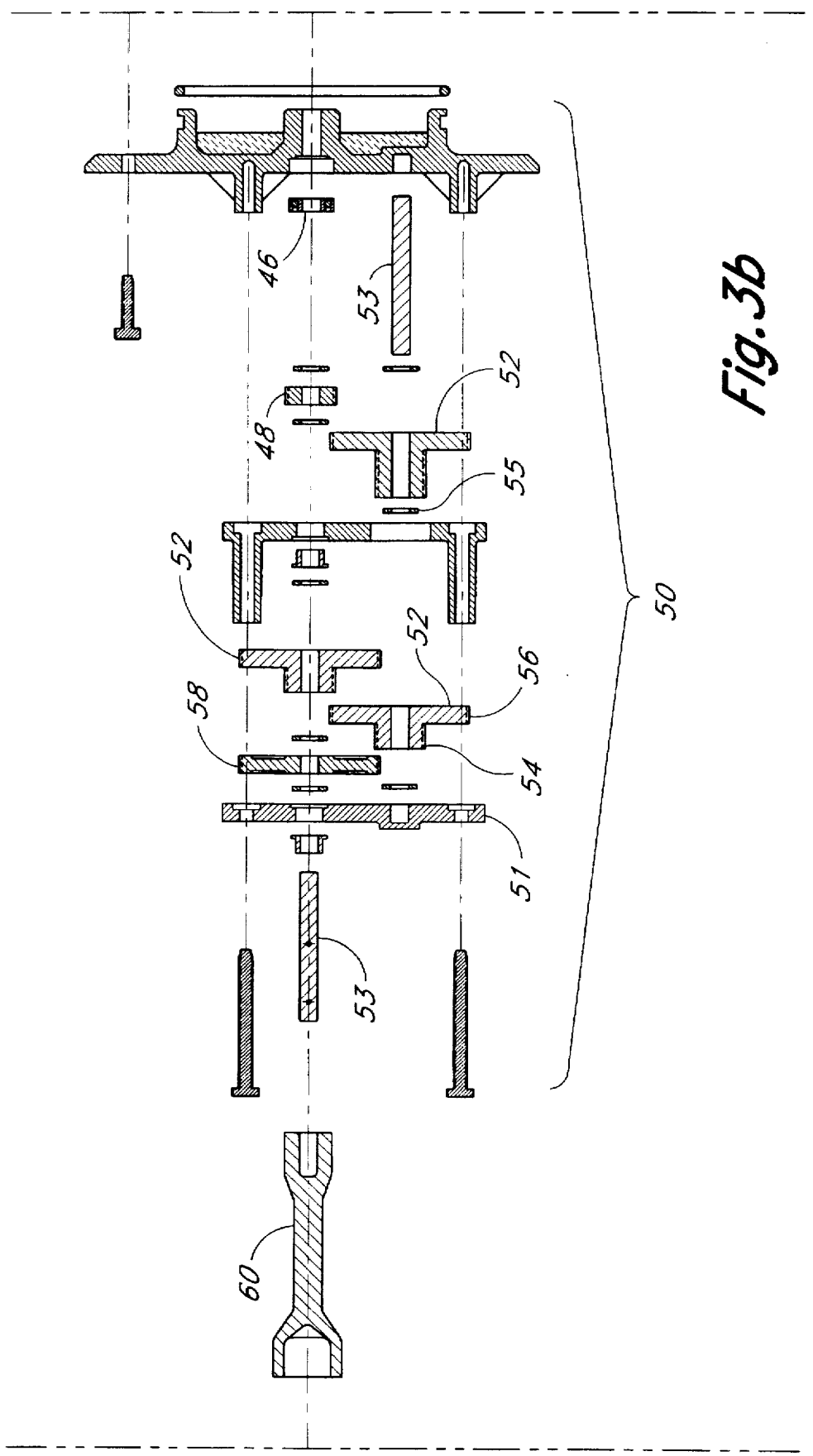
FIG. 3b is an expanded, exploded cross-sectional view of a portion of the pulsing valve depicted in FIG. 3.

The embodiment of the valve 10 shown in FIG. 1 is illustrated in exploded form in FIGS. 3, 3a, 3b, and 3c, in its operating environment in FIG. 2 and in an assembled cross-sectional view in FIG. 4. The valve's selector mechanism, described in greater detail below, is powered by a water turbine 38 located in the top portion 22 of the valve 10. Power for the turbine 38 is provided by water flow from the water turbine inlet line 16 which is separate from the valve's main water inlet line 12. Preferably, the water supplied to the water turbine inlet line 16 and the valve's main inlet line 12 is supplied to each by a pressurized water source 43. Either a separate pressurized water source 43 may be provided for the water turbine inlet line 16 and one for the valve's main water inlet line 12, or the same water source may be used.

By providing a separate water turbine inlet line 16 for driving the turbine 38 from the valve's main inlet line 12, the flow rate of the water turbine inlet line 16 can be separately controlled from the flow rate of the valve's main water inlet line. By separately controlling the flow of the water to the water turbine inlet line 16 and the valve's main inlet line 12, the switching speed of the selector mechanism, i.e., the cycling speed of the jets, can be varied independently of the water pressure reaching the spa occupant.

In a preferred embodiment, a speed control valve 39, which is a typical diverter type valve, is provided in the water turbine inlet line 16 between the pressurized water source 43 and the water turbine inlet to vary the water pressure delivered to the water turbine. When the speed control valve 39 is in the fully open position, water flows into the turbine 38 with greater pressure, thereby rotating the turbine 38 at a greater speed and providing a relatively short switching interval. If, on the other hand, the speed control valve 39 is partially closed, water flows into the turbine 38 with lesser pressure and the turbine 38 will rotate more slowly, thereby switching the output line less frequently. Therefore, by metering the pressure of the water supplied to the water turbine inlet line 16 using the speed control valve 39, the speed of the cycling, or switching, of the output lines can be altered.

In an other embodiment, a second valve 41, which is also a typical diverter type valve, is provided in the valve's main water inlet line 12 between the pressurized water source 43 and the valve's main water inlet. The second valve 41 is utilized to control the pressure of the water delivered to the pulsing valve 10 which is routed to the jets 24. The second valve 41 can be used to ensure that the water pressure reaching the valve's main water inlet line 12 does not exceed the maximum pressure that the pulsing valve 10 can sustain. In a preferred embodiment, the maximum pressure of the water that is routed by the cycle jet should not exceed 20 PSI. In some cases it may be desirable to enable the spa occupant to have access to the second valve 41 to control the pressure of the water that is delivered by the jets. In most cases, the position of the second valve 41 is preselected based upon the known water pressure of the system and is not changeable by the occupant. In those cases where the spa occupant is allowed to alter the pressure of the water delivered to the valve's main water inlet via the second valve 41, a bypass valve, such as a spring loaded check valve, (not shown) should be inserted after the second valve 41 and before the valve's main water inlet to be sure that the water pressure supplied to the valve's main water inlet line 12 does not exceed the maximum pressure that the valve 10 can handle.

In order to power the turbine 38, the pressure of the water delivered to the water turbine inlet line 16 may need to be higher than the maximum pressure of the water that can be routed by the pulsing valve 10 to the jets 24. By utilizing the second valve 41 to meter the pressure of the water delivered to the valve's main water inlet line 12, the water delivered to the water turbine inlet line 16 and the valve's main water inlet line 12 may be supplied by the same pressurized water source 43. When the same water source is used, a conventional three-way valve 45 is utilized to route a portion of the water from the water source 43 to the water turbine inlet line 16 or, in the case where the speed control valve 39 is used as shown in FIG. 2, a portion of the water is delivered to a water line that is connected to the speed control valve 39 which meters the water delivered to the water turbine inlet line 16. The remainder of the water from the water source 43 is delivered to the second valve 41. Even if the water delivered to the water turbine inlet line 16 and the valve's main water inlet line 12 are supplied by separate water sources 43, the second valve 41 may still be utilized to control the pressure of the water delivered to the pulsing valve 10 to ensure that the water pressure does not exceed the maximum pressure that the pulsing valve 10 can handle. Advantageously, the addition of the second valve 41 does not affect the operation of the speed control valve 39 which controls the speed of the cycling of the water outlet lines 14 and thus the cycling of the jets 24.

Figure 6:
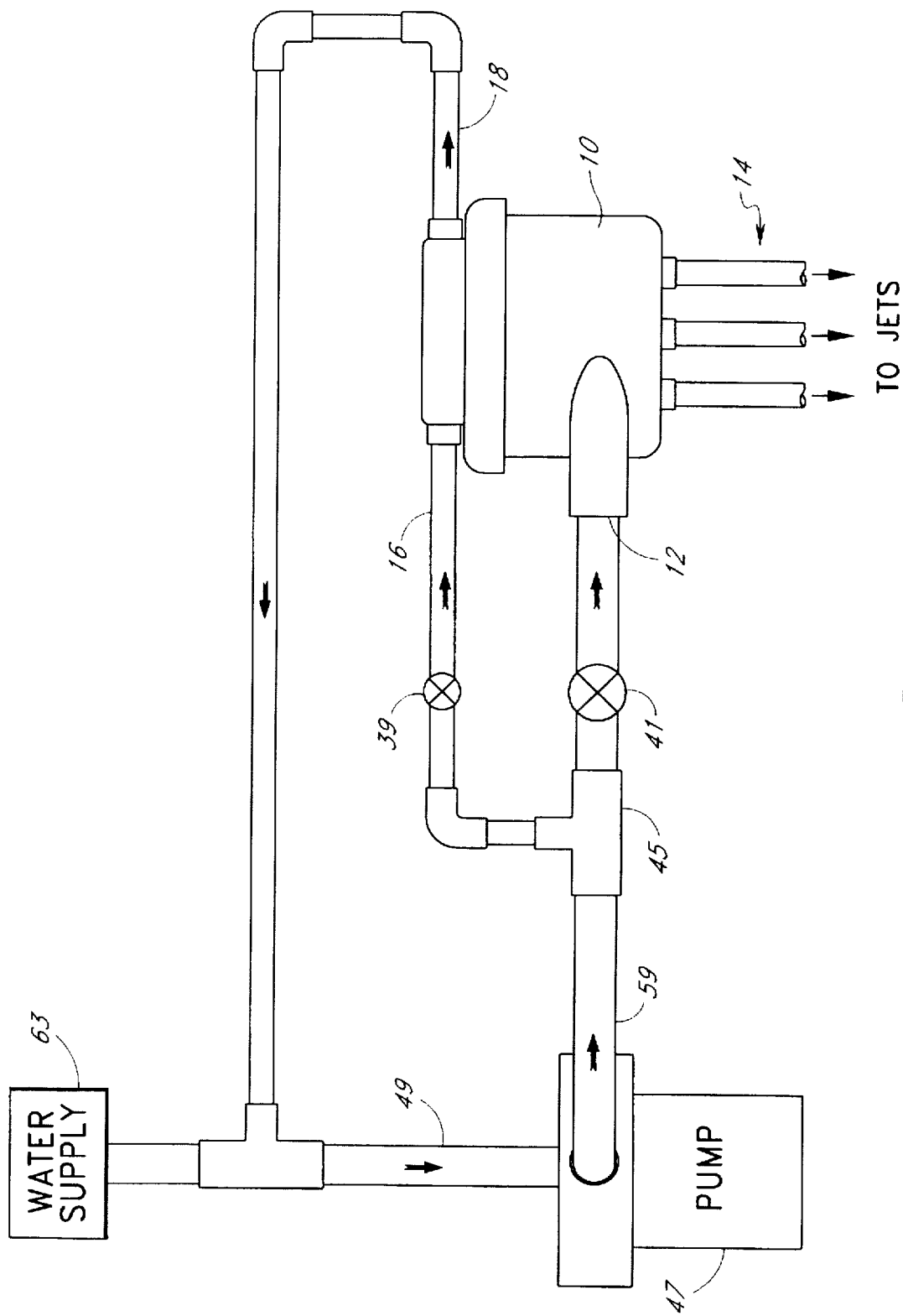
FIG. 6 illustrates generally an alternate operating environment of the pulsing valve in use with its own pump.

In one embodiment, as illustrated in FIG. 6, a pump 47 may be installed to provide the pressurized water to the turbine 38 of the pulsing valve 10. An input 49 of the pump 47 is connected to a water supply 63. An output 59 of the pump 47 is connected to the three-way valve 45 which divides the water between the water turbine inlet line 16 and the valve's main water inlet line 12. The pump 47 is a conventional water pump and operates as known to those of skill in the art to take the water delivered at its input 47 and to force the water through its output 59 at a pressure that is higher than its input pressure. In the preferred embodiment, the pump 47 should be capable of producing approximately 8 GPM at 15 PSI at the water turbine inlet line 16 and approximately 30 to 45 GPM at 15–18 PSI at the valve's main water inlet line 12.

Figure 7:
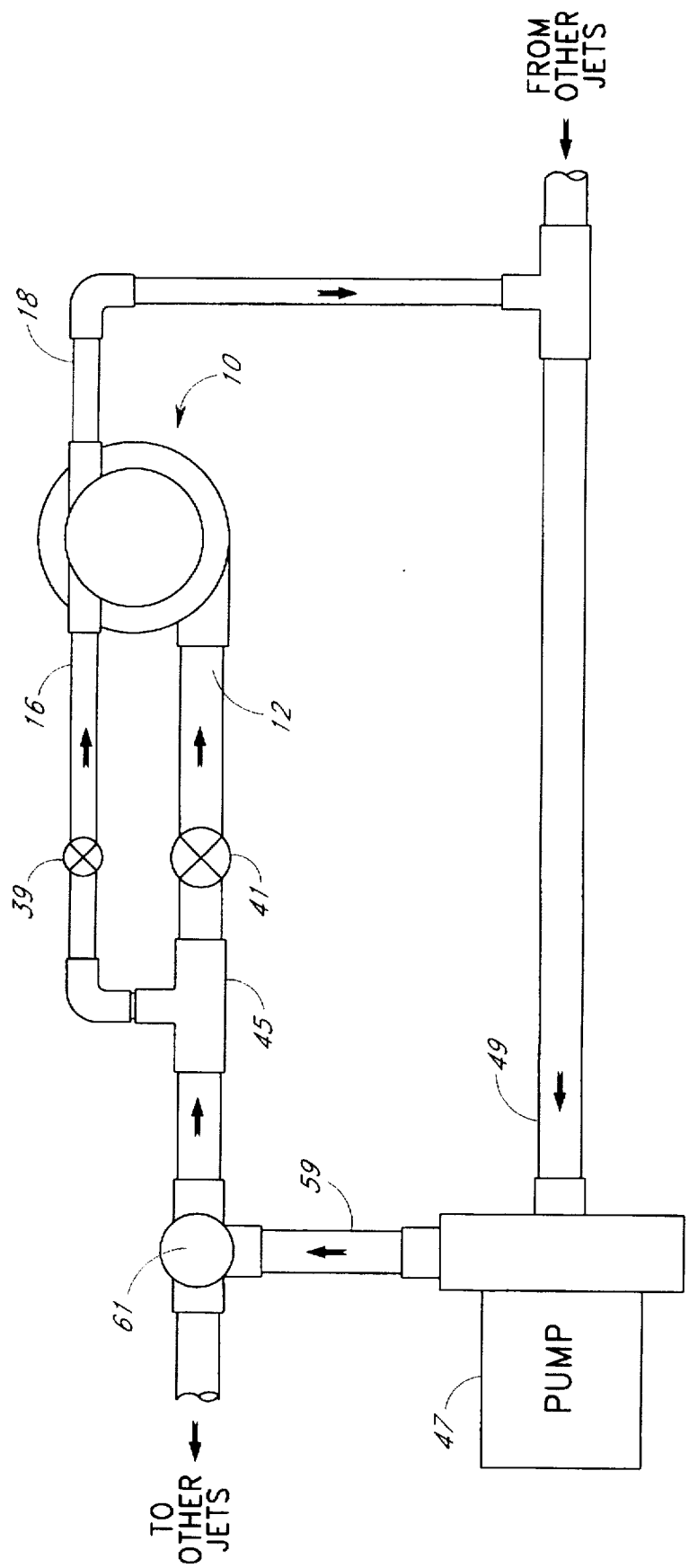
FIG. 7 illustrates generally an alternate operating environment of the pulsing valve in use with a pump that supplies pressurized water to other jets in a spa system.

As illustrated in FIG. 7, the pump 47 can be used to supply pressurized water to other jets in the spa. If such a configuration is desired, an optional second three-way valve 61 is installed to divert a portion of the pressurized water from the outlet 59 of the pump 47 to the other jets before the water reaches the three-way valve 45 for the pulsing valve 10.

Figure 8:
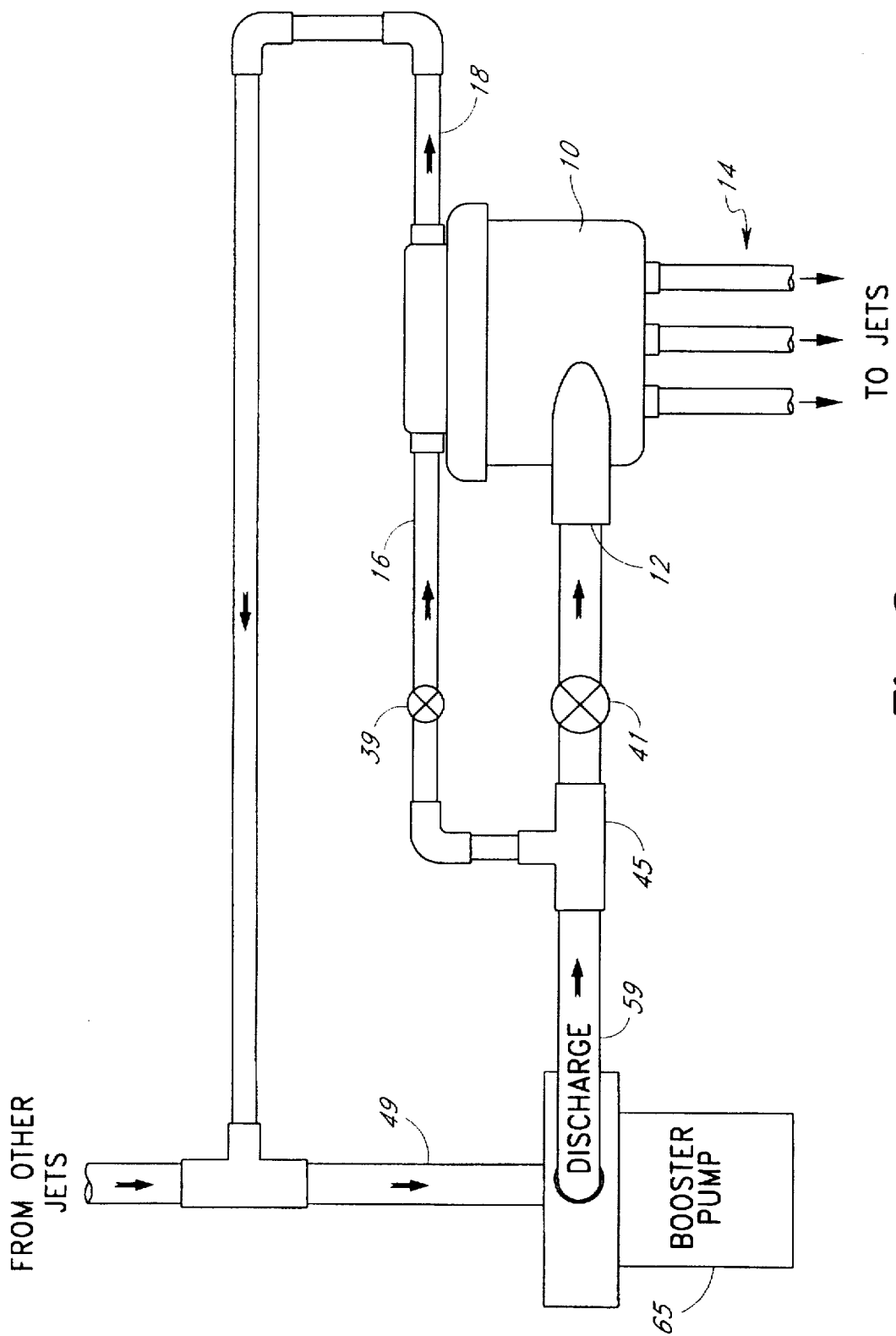
FIG. 8 illustrates generally an alternate operating environment of the pulsing valve in use with a booster pump and other jets in a spa system.

In an alternate embodiment, as illustrated in FIG. 8, when the pulsing valve 10 is part of a larger system of other jets (not shown), it may be desirable to additionally provide a booster pump 65 proximal to the pulsing valve 10 to increase the water pressure provided to the turbine 38 of the pulsing valve 10. In this embodiment, a regular pump 47 (as shown in FIG. 7) is provided in the system (not shown in FIG. 8) and the booster pump 65 is additionally provided to increase the water pressure provided to the turbine 38 of the pulsing valve 10. Preferably, the booster pump 65 is installed after the regular pump 47 and before the three-way valve 45, if provided, or the water turbine inlet line 16, if the three-way valve is not provided.

Referring back to FIGS. 3–4, the turbine 38 receives water from the water turbine inlet line 16 and extracts kinetic energy from the water stream. After the kinetic energy is removed the water is expelled from the turbine to the exhaust line 18 which returns the water to the water source 43 for re-pressurization. The operation of the water turbine is described in more detail below.

The water from the water turbine inlet line 16 turns a turbine wheel 40. The turbine wheel 40 is connected to a first drive shaft or output shaft 42 supported by bearings 44 and 46. The first drive shaft 42 rotates a driving gear 48 connected to a reduction gear drive 50 mounted in a housing 51. In the embodiment illustrated in FIGS. 3 and 4, the reduction gear drive 50 includes three reducing gears 52. Two of the reducing gears 52 are mounted on an auxiliary shaft 53 and separated by a spacer 55. Each of the gears 52 has a driving portion 54 and a driven portion 56. The driving portion of each gear 52 has 14 teeth, while the driven portion has 45 teeth. The driving portion of the final reducing gear 52 rotates an output gear 58, which is connected to an output or second drive shaft 60. This output shaft 60 supplies power to the selector 62, described in more detail below. In the embodiment illustrated in FIGS. 3 and 4, the ratio of the angular velocity of the output drive shaft 60 to that of the first drive shaft 42 less than 1:100. This reduction in angular velocity of the output drive shaft 60 advantageously allows it to provide sufficient torque to rotate the selector even in the presence of sand or other contaminants, thereby eliminating the seizure problem present in prior-art devices.

Figure 5:
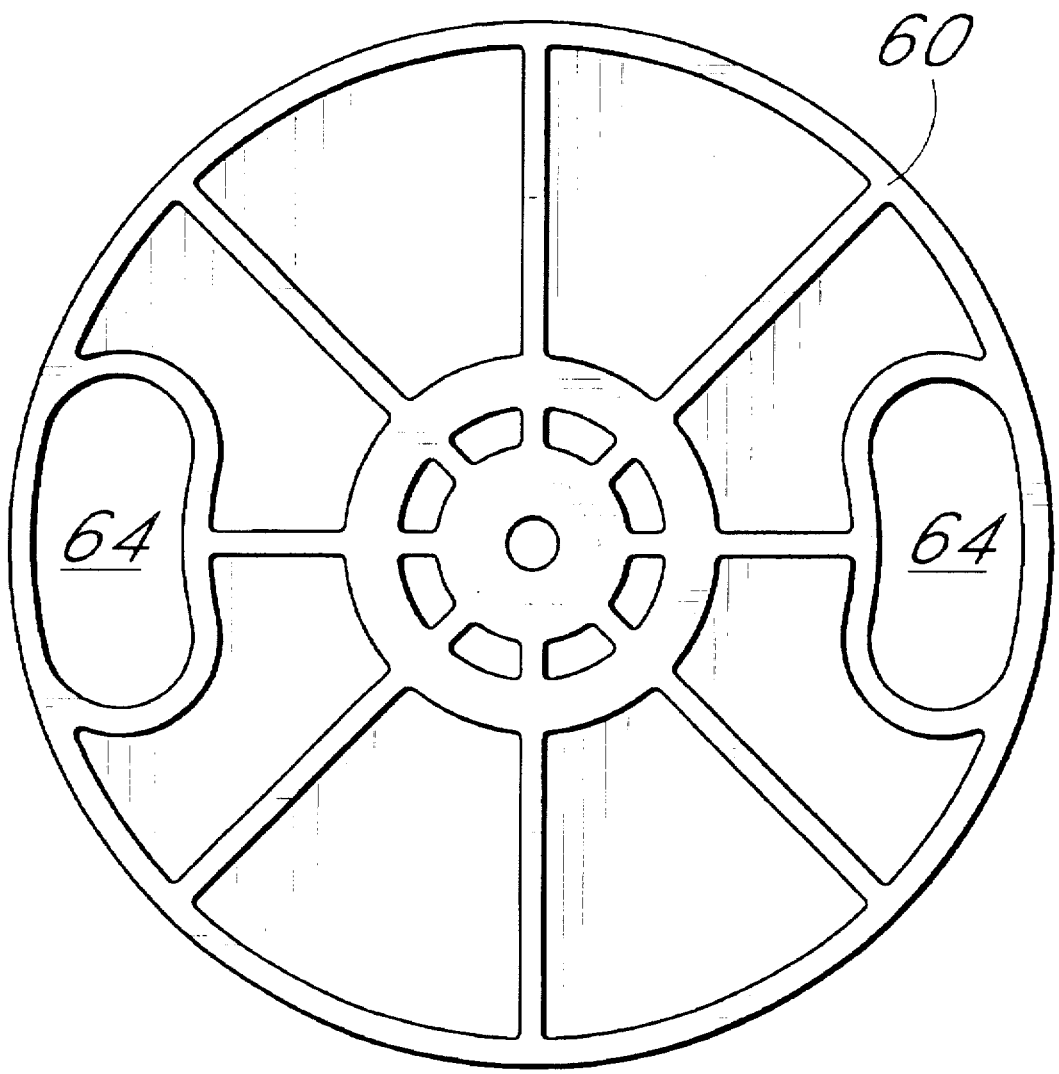
FIG. 5 is a top view of a first selector disk contained in the pulsing valve of FIGS. 3 and 4.

The output drive shaft 60 is connected to a first selector disk 62, illustrated in top view in FIG. 5. The first selector disk 62, which is also referred to as a rotor, is mounted on a shaft 66 and on thrust bearings 68 which allow the output drive shaft 60 to rotate the first selector disk 62. The first selector disk 62 is solid except for two openings 64. The openings 64 oppose a plurality of water discharge ports, or outlets, 69 in the valve body 20 which are connected to individual water outlet lines 14. The provision of the openings 64 at 180 degree intervals advantageously balances the forces applied to the selector 62 by the water flowing through it during operation of the spa.

In operation, water passes into the body 20 of the valve through the main water inlet line 12. The water then travels through diffuser disks 70 and 72 which contain perforations to allow the passage of the water to the region of the first selector disk 62 without flowing forcefully against the first selector disk 62. Water then passes through the openings 64 in the selector to the individual outlet lines 14 which are opposite the openings 64. As the output drive shaft 60 rotates the first selector disk 62, the openings 64 in the first selector disk 62 rotate, thereby directing water flow to different water discharge ports 69 which feed the outlet lines 14 and sequentially switching water flow among the individual lines 14 in a periodic manner. The water from each of the outlet lines 14 is preferably mixed with an from an air source (FIG. 1) at each of the jets 24 and the combination air/water stream is delivered to the spa occupant.

While the first selector disk 62, illustrated in FIG. 5, contains two outlet openings, it can also be provided with only one opening or with three or more openings. The number of openings 64 provided in the first selector disk 62 depends on a number of factors including the number of outlet lines 14 which are provided as well as the geometric configuration of the jets 24 and the desired massage effect. In the embodiment illustrated in FIGS. 1–5, in which the whirlpool is configured for back massage, it is desirable to provide six jets 24. Thus, the valve body 20 is provided with six outlet ports 69 each of which is connected to its own outlet line 14, corresponding to one of each of the six jets 24. Using the first selector disk 62 with this configuration, two of the jets are energized at the same time. As mentioned above, the energizing of the outlet lines pairwise also balances the forces applied to the first selector disk 62 by water flow.

Figure 16:
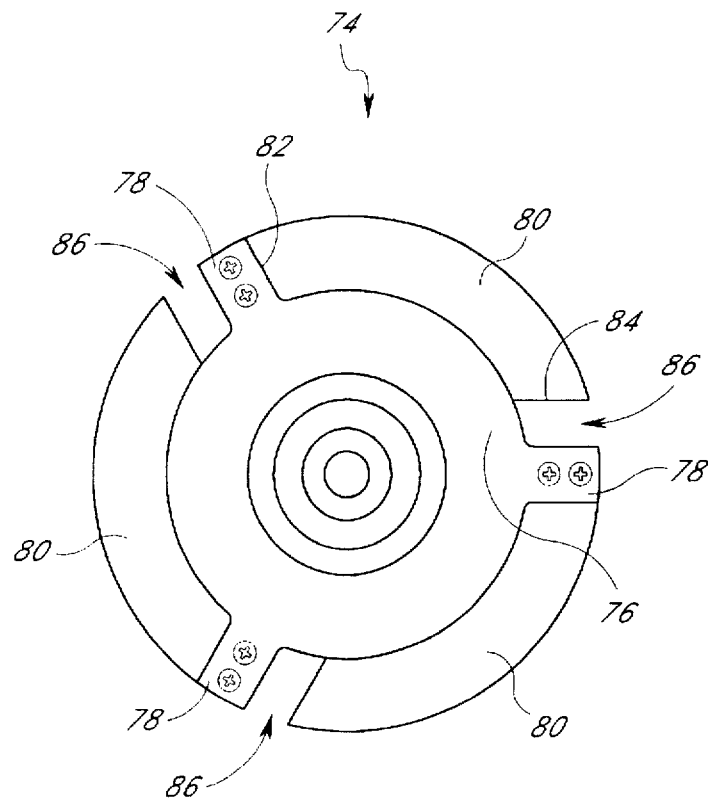
FIG. 16 is a top view of one embodiment of a second selector disk which may be contained in the pulsing valve of FIGS. 3 and 4.
Figure 17:
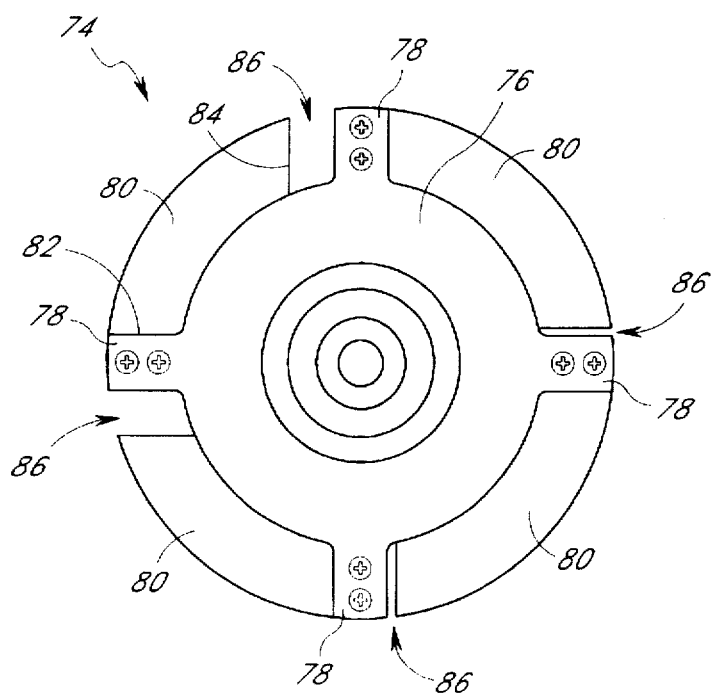
FIG. 17 is a top view of another embodiment of a second selector disk which may be contained in the pulsing valve of FIGS. 3 and 4.

In another embodiment, the first selector disk, or rotor, 62 is replaced by a second selector disk 74. Referring to FIGS. 16–17, the second selector disk 74 preferably comprises a central plate 76 with a plurality of attachment members, or tabs, 78 and a plurality of wipers 80. The attachment members 78 extend radially outward from the central plate 76 and are evenly spaced around the circumference of the central plate 76. The wipers 80 are thin, flat, and arc-shaped. A first end 82 of each of the wipers 80 is attached to an attachment member 78 such that a second end 84 of the wiper 80 is spaced from the next attachment member 78 around the circumference of the plate 76, thus forming an opening 86 between the second end 84 of the wiper 80 and the next attachment member 78.

Figure 18:
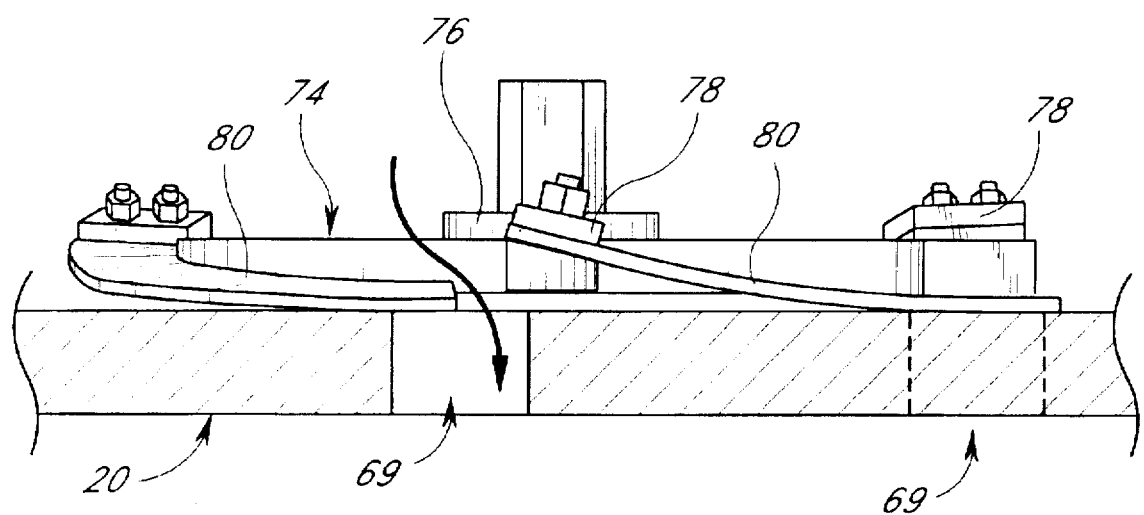
FIG. 18 is an end view of the second selector disk of FIG. 17.
Figure 19A:
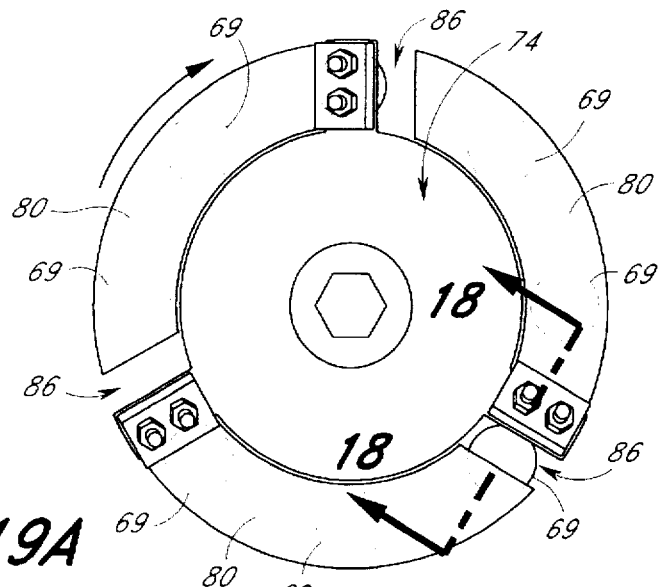
FIG. 19a–19c is a top view of the second selector disk of FIG. 16 mounted in the housing and illustrating the succession of the opening of the ports below the disk.
Figure 19B:
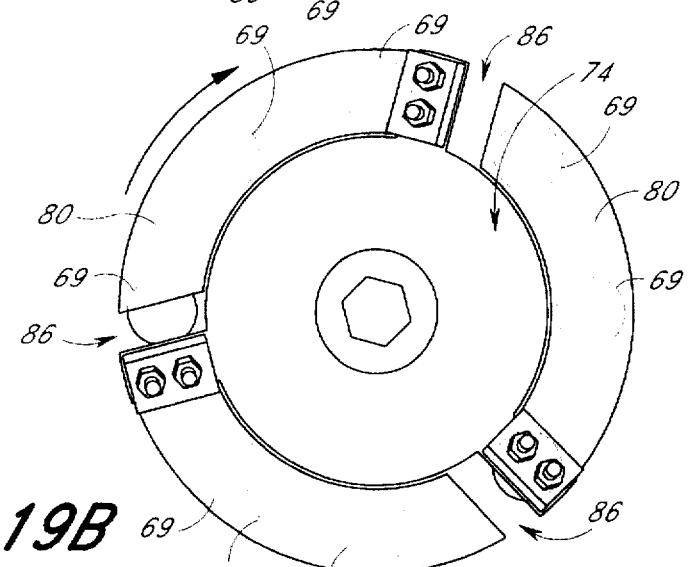
Figure 19C:
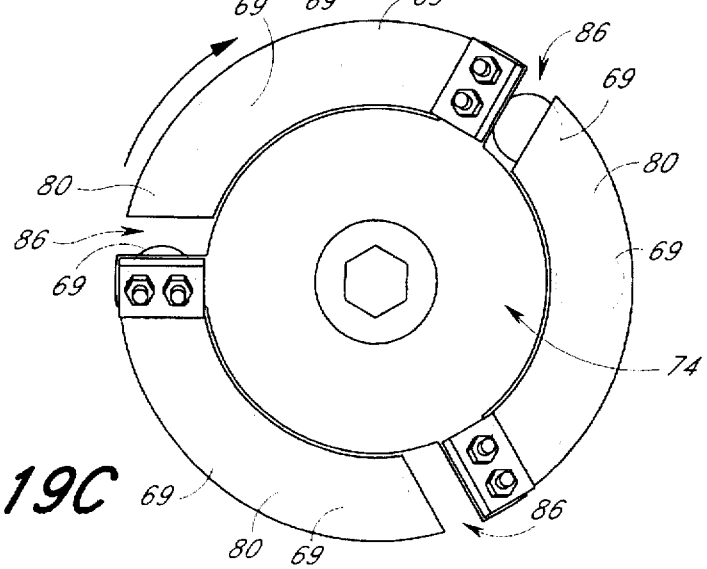
Figure 20A:
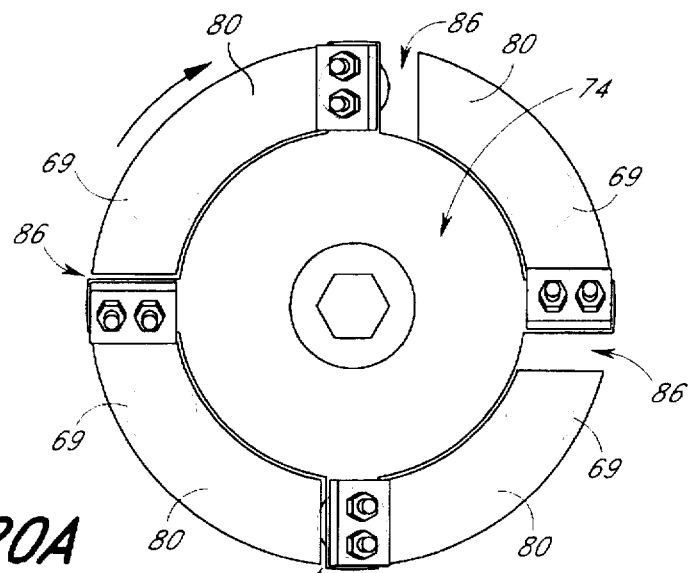
FIG. 20a–20c is a top view of the second selector disk of FIG. 17 mounted in the housing and illustrating the succession of the opening of the ports below the disk.
Figure 20B:
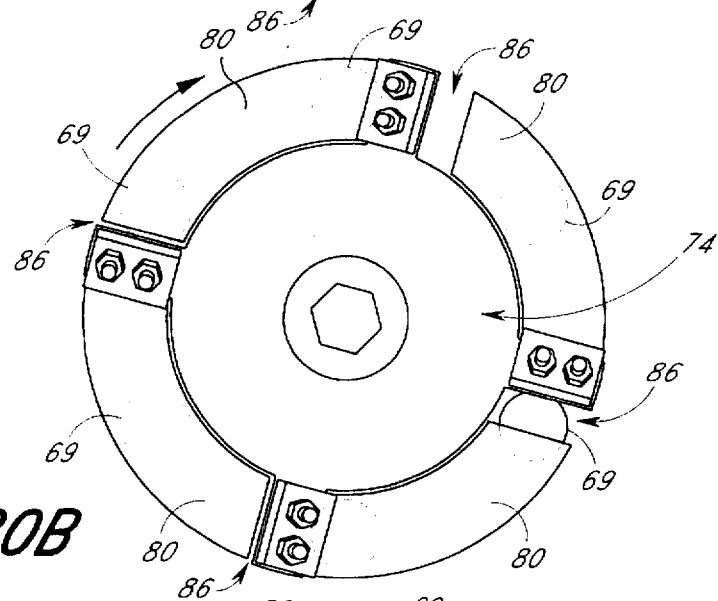
Figure 20C:
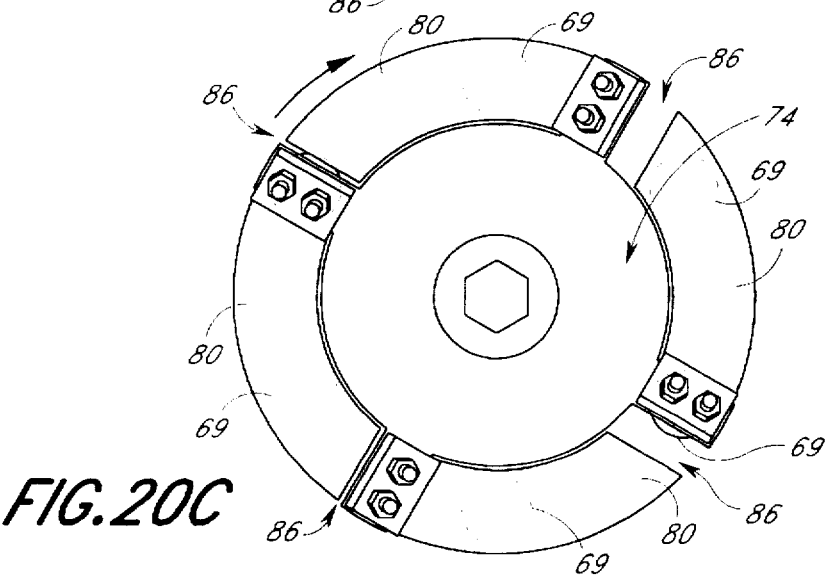

The wipers 80 are preferably made from a flexible plastic material, such as a high molecular weight polyethylene, and are between approximately 0.050 and 0.110 inches thick. The central plate 76 and attachment members 78 are preferably formed from a single piece of plastic or stainless steel. The plate 76 and attachment members 78 are preferably approximately 0.110 inches thick. As illustrated in FIG. 18, the wipers 80 in addition to being flexible and are sloped downwards from the attachment member 78. The sloped profile of the wipers 80 assists in achieving a "hard turn-on" and a "soft turn-off" of the jets which is preferable to the user. More specifically, as the selector disk 74 rotates, the wiper 80 is in direct contact with the floor of the valve body 20 forming a good seal to close the discharge ports. As an opening 86 on the disk 74 passes over a discharge port 69 to open or "turn-on" the port, the previously sealed off port 69 receives a sudden rush of water. This quick change from a sealed closed port to an open port results in a quick change in the pressurized water being delivered to the jets which is referred to as a "hard turn-on". As the selector disk 74 continues to turn, the next wiper 80 will begin to cover the port 69 to close it off. Since the wipers 80 are sloped downwards from the attachment members 78, the wiper 80 will slowly interfere with water flow into the valve body 20 as the wiper passes over the port 69 to slowly close off the previously open port 69. This will result in a slow reduction in the water pressure delivered to the discharge port 69 and its associated output jet which is referred to as a "soft turn-off".

By forming the wipers 80 from a flexible plastic material and by sloping them towards the floor of the valve body 20 (FIG. 4), the wipers 80 achieve a better seal against the water discharge ports 69 (FIG. 4) in the valve body 20. Advantageously, the flexible plastic wipers 80 require less clearance between the second selector disk 74 and the discharge openings 69 than the all aluminum embodiment of the first selector disk 62. The reduced clearance between the second selector disk 74 and the discharge openings 69 results in decreased leak-by, i.e., leakage around the selector disk that was caused by the previously larger clearance between the valve body 20 and the first selector disk 62. In addition, the force of the water flowing through the valve presses the flexible wipers 80 against the closed discharge ports 69 thereby forming a tighter seal against the closed ports. The increased seal achievable with the second selector disk 74 advantageously enables more efficient use of the water being delivered to the unit, i.e., requiring fewer gallons per minute (GPM) of water, to power the jets. Also, as discussed above, the improved seal provides for a more distinct pulsation to be delivered to the user by providing a greater differentiation in pressure when a single discharge port 69 is open and when it is closed.

Finally, the flexibility of the wipers 80 enable the wipers to "walk over" the impurities in the valve body 20. More specifically, the flexibility of the wipers 80 enables the wipers to slide over the impurities which may collect on the floor of the valve body 20 without disrupting the rotation of the second selector disk 74. The ability of the selector disk 74 to continue rotating in the presence of impurities without seizing up occurs even though the second selector disk 74 provides a lower clearance between the valve body and the selector disk 74 than the first selector disk 62.

The number N of discharge outlets 69 in the valve body 20 and the number M of openings 86 in the selector disk 74 may be varied. To increase the rapidity of the pulsing operation, the numbers N and M should be different from one another, and preferably neither should be evenly divisible by the other. There will be N*M alignments of outlets and openings during each rotation of the selector disk 74, so that a discharge outlet 69 is opened and water is delivered to its corresponding jet at each 360/N*M degrees of rotation of the disk 74. It will be appreciated that, if a single opening 86 in the selector disk 74 were used, N*M outlets 69 would be required to deliver water to each of the jets in the same rapid succession.

As illustrated in FIGS. 16 and 19a–19c, when the second selector disk 74 is used in a valve that is supplying water to eight jets, i.e., the valve body 20 has eight outlet ports or discharge outlets 69 connected to eight outlet lines 14 (FIG. 1), the second selector disk 74 preferably comprises three tabs 78 which are evenly spaced at 120 degree intervals around the circumference of the central plate 76. Each of the three tabs 78 is connected to a wiper 80 thereby forming three evenly spaced openings 86 in the second selector disk 74 between the second end 84 of each wiper 80 and the next attachment member 78 around the circumference of the central plate 76. As described above, at 360/N*M degrees an outlet port 69 is opened. In this example, with every 360/8*3 or 15 degrees of rotation of the selector disk 74, one of the outlet ports 69 is open. It will be appreciated that, if a single opening 86 in the selector disk 74 were used, N*M, or 24*1=24 outlets 69 would be required to deliver water to the different jet in the same rapid succession. Twenty-four outlets 69 would virtually fill the bottom of the valve body 20, so that a single discharge port 69 would never be closed, but instead the single opening on the selector disk 74 would span between pairs of ports. This would result in much less distinct pulsing from the jets, and reduced hydrotherapy action.

When the second selector disk 74 is used in a valve that is supplying water to six jets, i.e., the valve body 20 has six discharge outlets 69 connected to six outlet lines 14, the second selector disk 74 preferably comprises four tabs 78 which are evenly spaced at 90 degree intervals around the circumference of the central plate 76, as shown in FIG. 17 and 20a–20c. Each of the four tabs 78 is connected to a wiper 80 thereby forming four openings 86 in the second selector disk 74 between the second end 84 of each wiper 80 and the next attachment member 78 around the circumference of the central plate 76. As described above, at 360/N*M degrees an outlet port 69 is opened. Using this equation, with every 360/6*4 or 15 degrees of rotation of the selector disk 74, one of the outlet ports 69 would be opened. However, in the preferred embodiment, the openings 86 in the selector disk 74 are not evenly spaced openings. Two of the openings 86 in succession are larger than the next two openings 86 in succession. This is provided to ensure that when one of the ports 69 is being closed by the wiper 80 a port 69 on the opposite side of the selector disk 74 is slightly opened, thus balancing the pressure forces on the selector disk 74.

Another feature, caused by choosing the number of openings 86 in the selector disk 74 and the number of discharge ports 69 as described above, results in the next opening on the selector disk 74 which opens a port 69 to be located on the opposite side of the disk 74 from the location of the opening 86 of the selector disk 74 which opened the previous port 69. The opening of ports 69 using openings 86 on opposite sides of the selector disk 74 in succession provides for a more distinct pulsation from each jet and a cleaner transition from an open port to a closed port. Finally, as one port is being closed another port is being opened. Thus, the flow of water from the inlet line 12 to the output ports 69 is never completely closed off, i.e., the water always has an opening in the selector disk 74 to flow through to one of the outlet ports 69. This results in the reduction of the internal pressure spikes that occur when the valve cycles from opening one outlet port 69 to another, thereby achieving smoother operation of the valve. The shock to the system resulting from the internal pressure spike when the first selector disk 62 was used was 6 to 8 PSI. These internal pressure spikes were caused by having an interval in time where all of the outlet ports 69 were closed off by the first selector disk 62 and the pressurized water had no outlet 69 yo flow through until the next outlet port 69 was open and the pressurized water had somewhere to go. The shock to the system resulting from the internal pressure spike when the second selector disk 74 is used and the ports are energized in the configurations described above is less than 2 PSI, because there is virtually no interval in time during the rotation of the second selector disk when one of the outlet ports is not open to provide a path for the pressurized water to flow through the valve. By always providing a path for the water to flow, the configuration of the openings in the second selector disk 74 in association with the number of discharge ports results in reduced internal pressure spikes in the valve.

Figure 9:
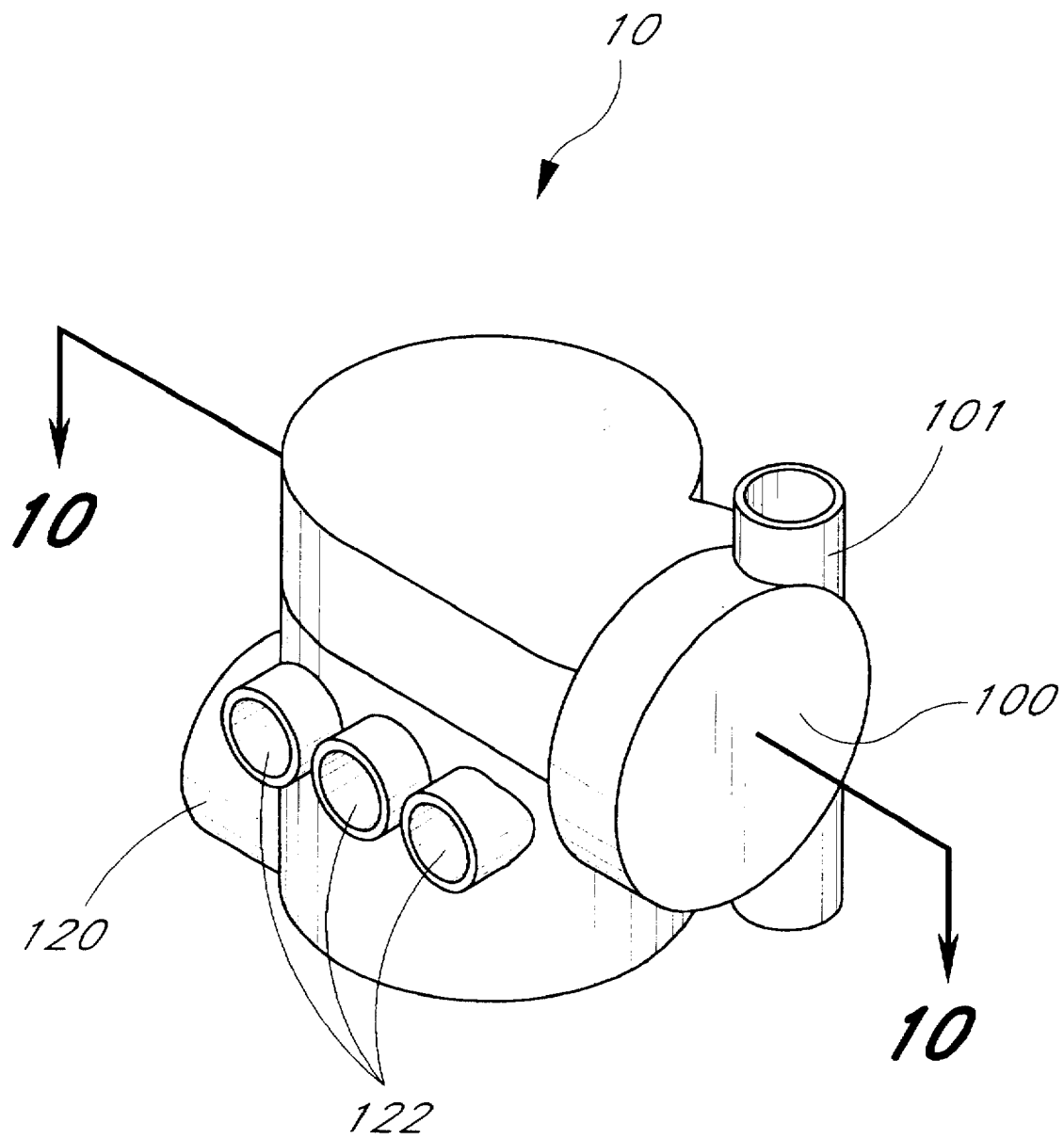
FIG. 9 is a perspective view of an alternate embodiment of the pulsing valve of the present invention.
Figure 10:
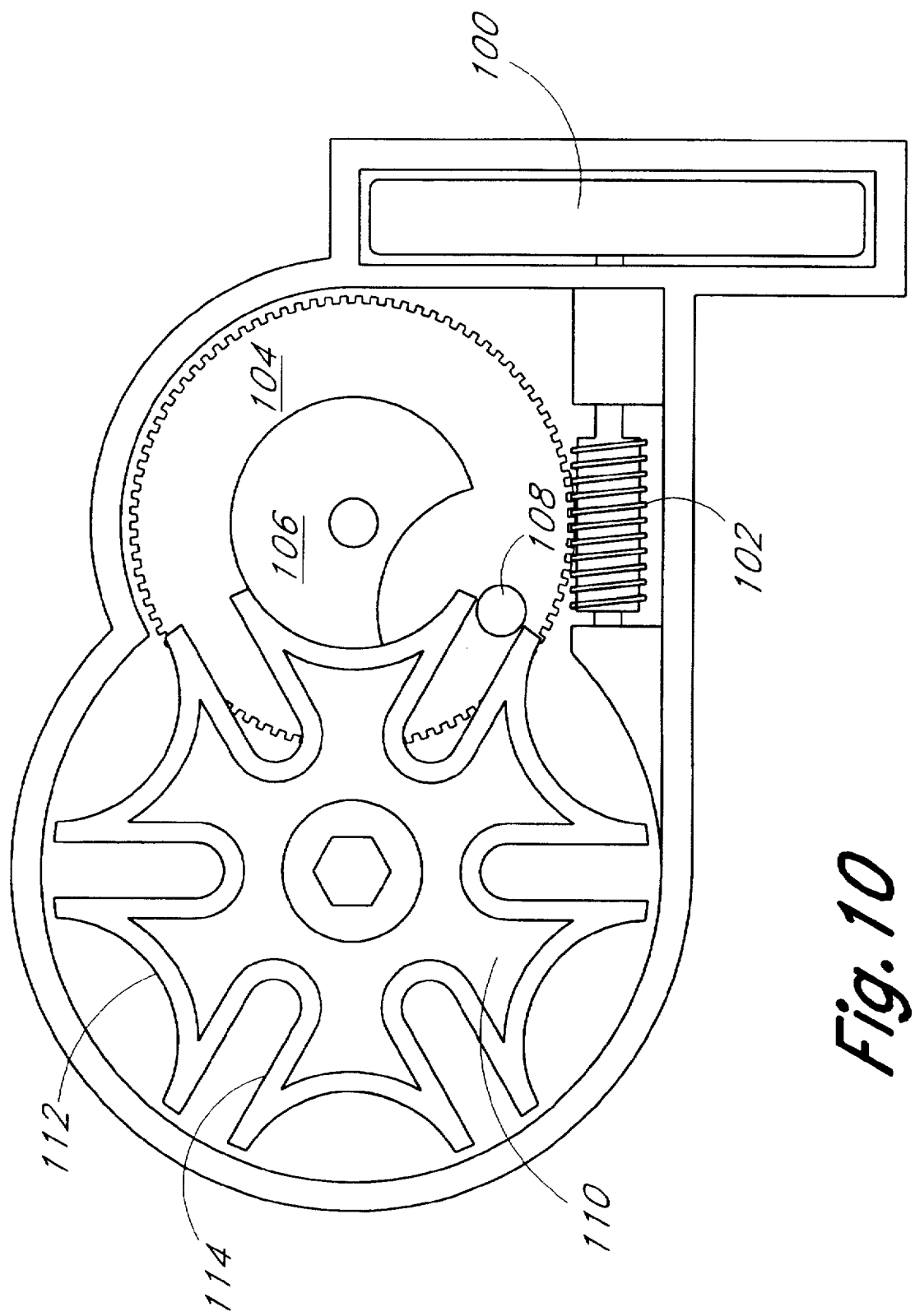
FIG. 10 is a top view of the reduction gear assembly of the valve illustrated in FIG. 9.
Figure 11:
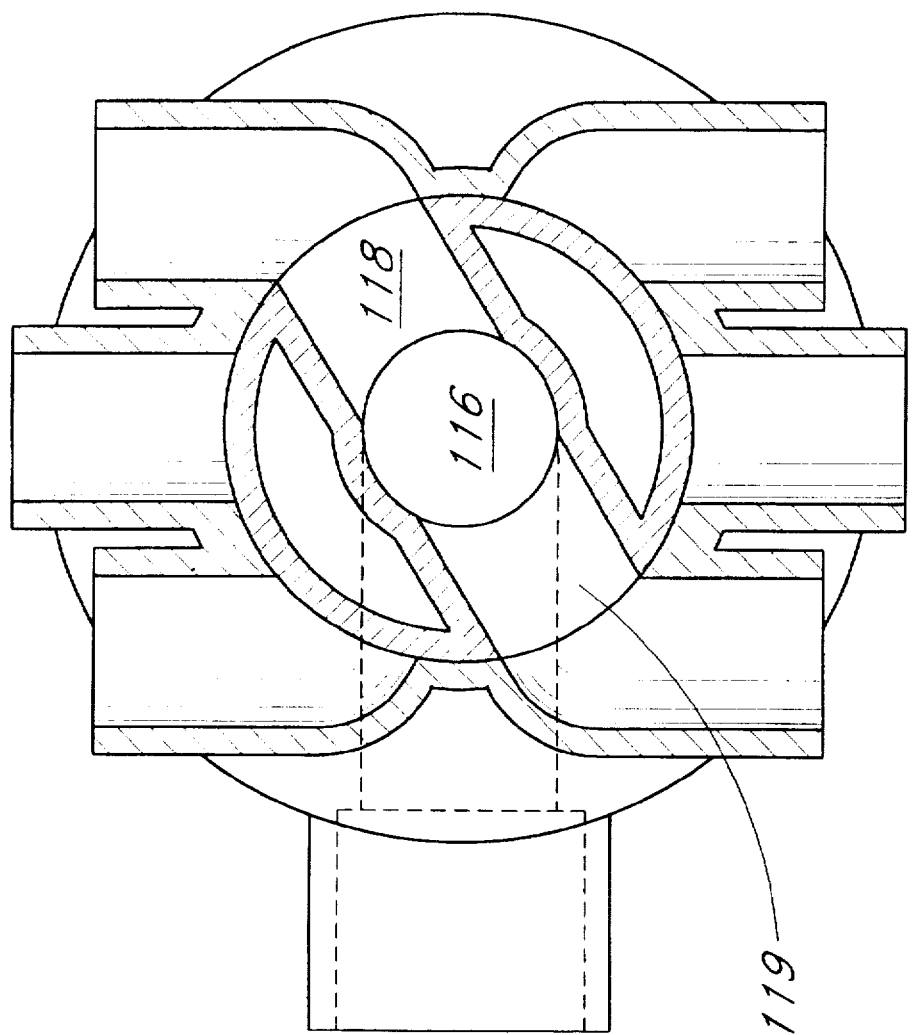
FIG. 11 is a cross-sectional view of the switching mechanism of the valve illustrated in FIG. 9.

An alternate embodiment of the invention employing a Geneva reduction gear drive is illustrated in FIGS. 9–11. As with the first embodiment, the reduction gear drive of this embodiment is driven by a water turbine 100 having a separate water inlet line 101, which rotates a worm gear 102. The worm gear 102 rotates a toothed gear 104. This toothed gear includes a raised cylindrical center section 106 and a peg 108.

The toothed gear 104 opposes a Geneva gear 110 which has a plurality of arcuate faces 112 and slots 114. As the worm gear 102 rotates the toothed gear 104, the peg 108 on the gear 104 engages one of the slots 114 on the Geneva gear, causing the Geneva gear to rotate with the toothed gear 104 through a preset angle. When the Geneva gear 110 has rotated through this angle, the peg 108 moves away from engagement with the slot 114, and the raised center section 106 of the toothed gear 104 rotates to oppose one of the arcuate faces 112 of the Geneva gear. This center section rotates opposite the face 112 of the Geneva gear without moving it until the peg 108 has rotated sufficiently to again come into engagement with another of the Geneva gear's slots 114, whereupon the rotation of the Geneva gear is repeated.

The Geneva gear 110 is connected to a shaft 116 (FIG. 11), to which a first selector disk 118 is also attached. As in the first-described embodiment, the first selector disk contains openings 119 which direct water from the inlet line 120 into the outlet lines 122 in pairwise fashion. As the Geneva gear 110 rotates, the openings on the first selector disk 118 move into opposition with different outlet line openings, thereby periodically routing water to different pairs of outlet lines.

In addition to reduced susceptibility to seizure from contaminant accumulations and the ability to control switching speed independently of water pressure, the Geneva reduction gear drive advantageously provides a sharper switching action between the individual water jets than the reduction gear drive of the first embodiment because of its stepwise, rather than continuous, movement. This more abrupt switching made possible by the use of the Geneva reduction gear drive improves the overall quality of the massage.

Figure 12:
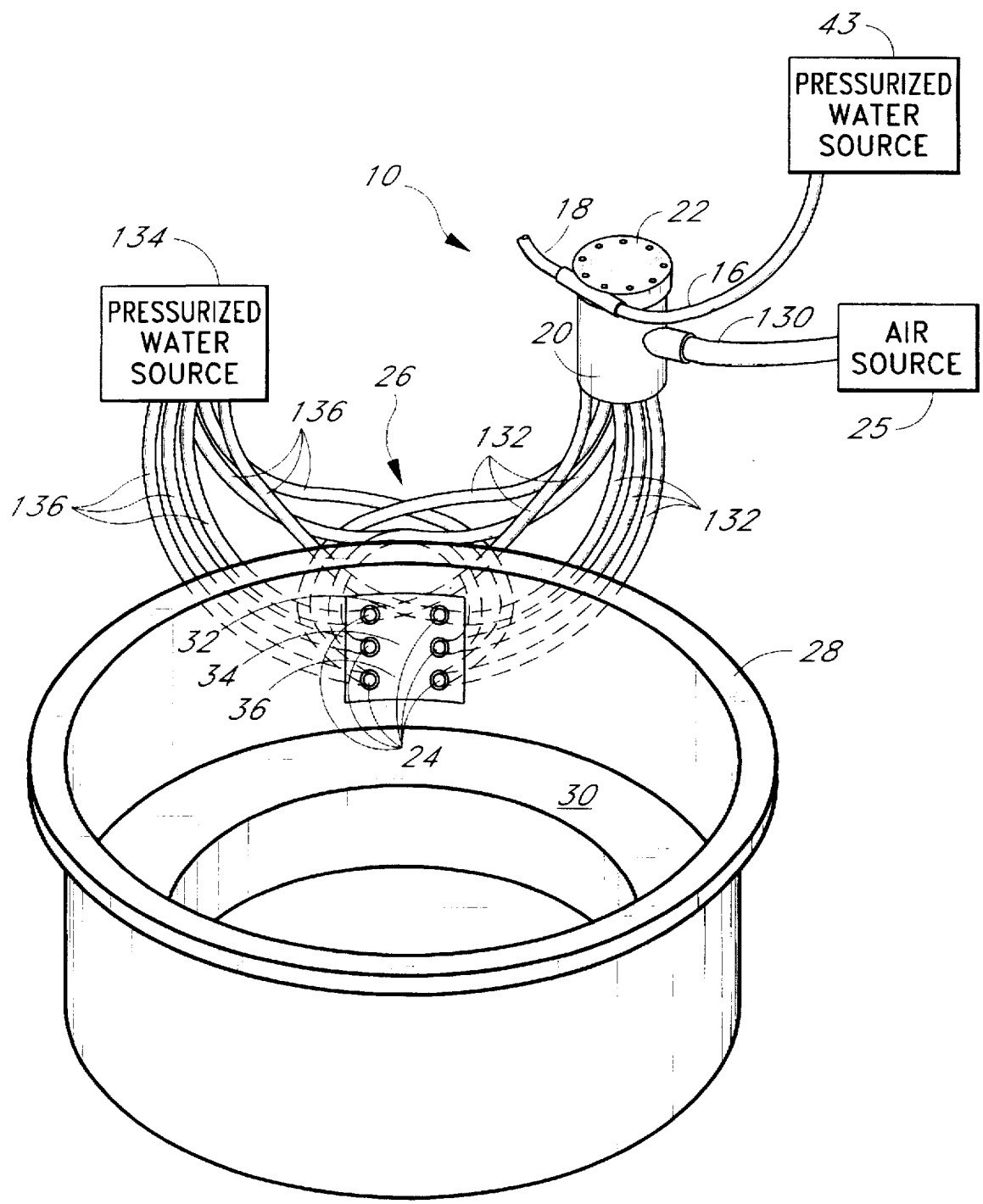
FIG. 12 illustrates generally the pulsing valve of the present invention and its operating environment for use with cycling air.
Figure 13:
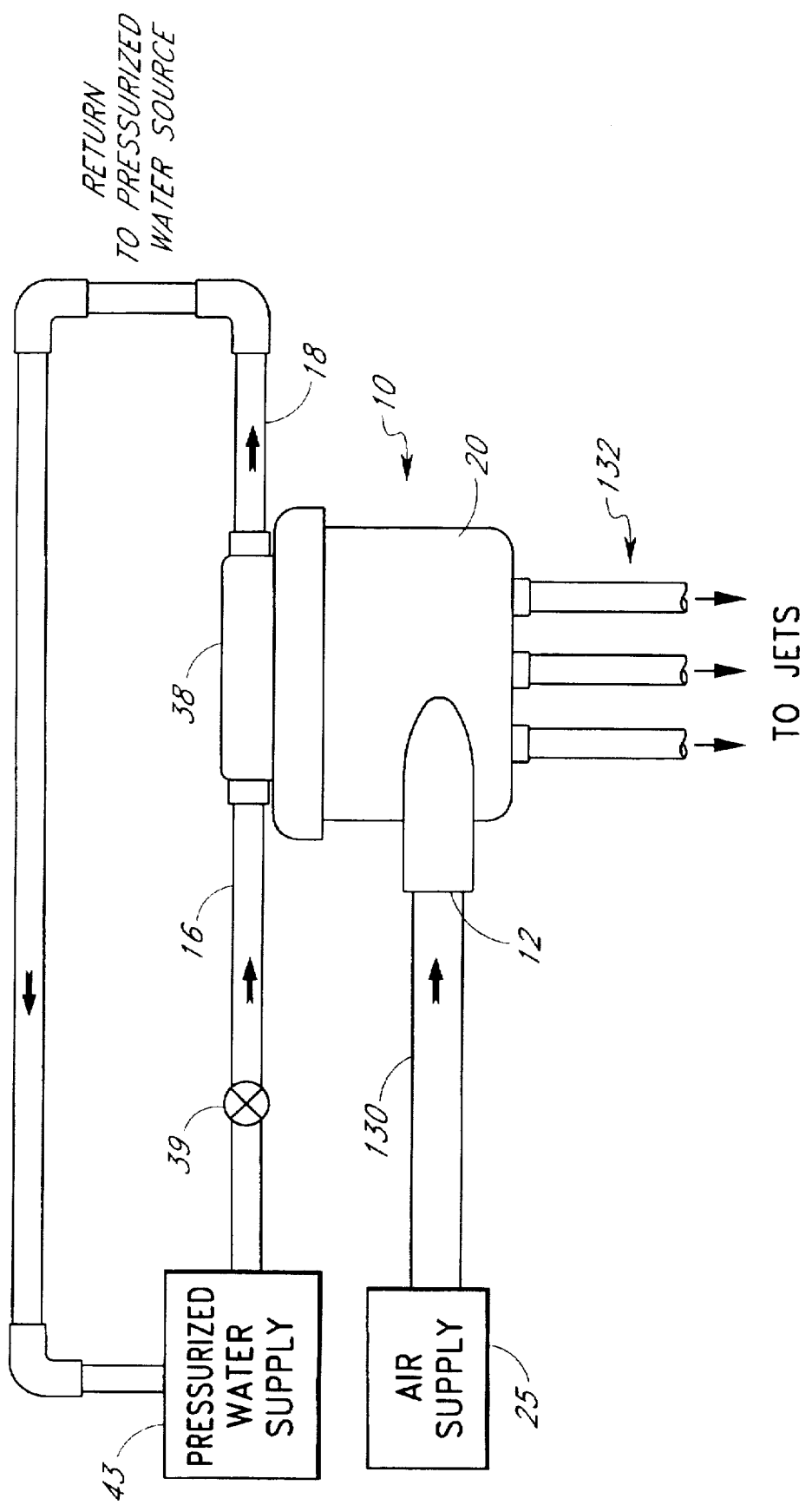
FIG. 13 illustrates generally the operating environment of the pulsing valve for cycling air.

In an alternate embodiment, as illustrated in FIGS. 12–13, the pulsing valve 10 may be used to cycle air instead of water. The operation of the pulsing valve 10 is the same as in the water cycling operation described in association with FIGS. 1–11 above. By way of example, the operation of the embodiment of the pulsing valve 10 described in association with FIGS. 1–5 above will be described as cycling air below.

In the air cycling embodiment, the main water supply line 12 is replaced with an air supply line 130 which is connected to an air supply 25. The power for the turbine 38 is still provided by water flow from the water turbine inlet line 16. By powering the turbine utilizing water from the pressurized water source 43 instead of using air from the air source 27, the switching speed of the selector mechanism may be varied independently of the pressure of the air sent to the jets 24. In this embodiment, the speed control valve 39 may be provided in the water turbine inlet line 16 to vary the water pressure delivered to the water turbine 38 as described above in association with the water cycling embodiment to control the speed of the cycling of the air routed to the air output lines 132.

In operation, air from the air source 25 passes into the body 20 of the valve 10 through the air inlet line 130, where it is directed by the valve 10 into one or more of the air outlet lines 132. Referring also to FIG. 4, once the air enters the valve body 20, the air then travels through diffuser disks 70 and 72 which contain perforations to allow the passage of the air to the region of the first selector disk 62 without flowing forcefully against the disk 62. Air then passes through the openings 64 in the selector to the individual air outlet lines 132, which correspond to the water outlet lines 14 in FIG. 4, which are opposite the openings 64. As the output drive shaft 60 rotates the first selector disk 62, the openings 64 in the first selector disk rotate, thereby directing air flow to different outlet lines 132 and sequentially switching air flow among the individual lines 132 in a periodic manner.

Air from each of the outlet lines 132 is delivered to each of the respective jets 24. Each of the jets 24 are also connected to a pressurized water source 134 through water supply lines 136. The water from the water source 134 is constantly supplied to each jets 24 by its respective water supply line 136 regardless of whether or not air is being routed to that particular jet 24 by the valve 10 at that exact moment. At each jet, the air from its respective outlet line 132 is mixed with the constant water flow supplied by its water supply line 136 and the resulting combination air/water stream is delivered to the spa occupant. When air is not being routed to a particular jet 24 by the pulsing valve 10, the force of the mostly water stream supplied by the jet 24 is low. When air is supplied to a particular jet 24 by the valve 10, the force of the combination air/water stream supplied by the jet 24 becomes much higher. The cycling from a lower pressure mostly water stream to a higher pressure air/water stream at each jet 24 provides a pulsing effect from each jet 24 for the spa occupant. Thus, by changing the valve 10 from cycling air instead of cycling water, the output from the jets 24 is altered to provide more of a pulsing sensation to the spa occupant. This feature is advantageous, as the valve hardware does not have to be altered, only the air and water connections to the valve and jets need be altered.

Figure 14:
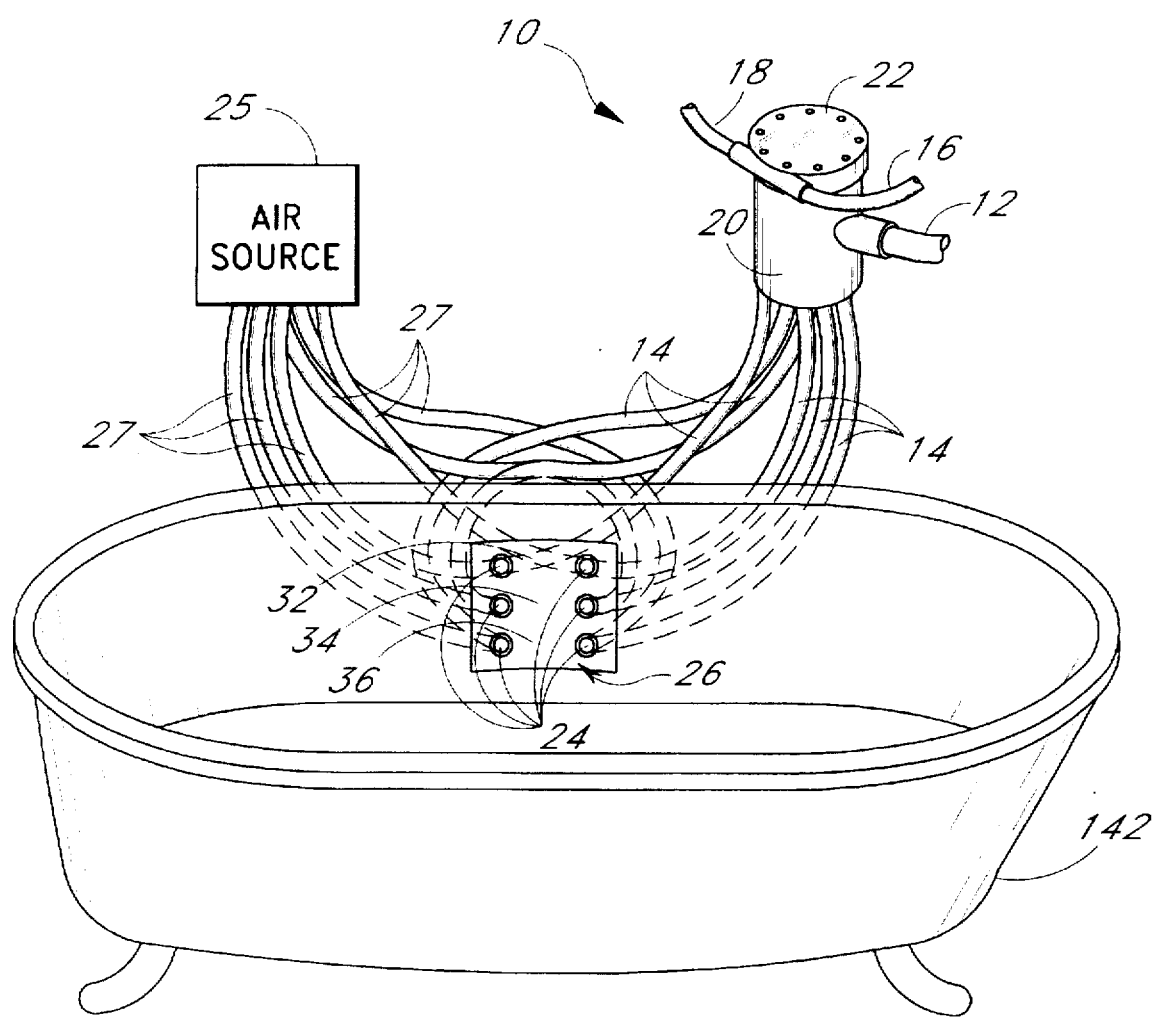
FIG. 14 illustrates generally the pulsing valve of the present invention and its operating environment for use with cycling tap water.
Figure 15:
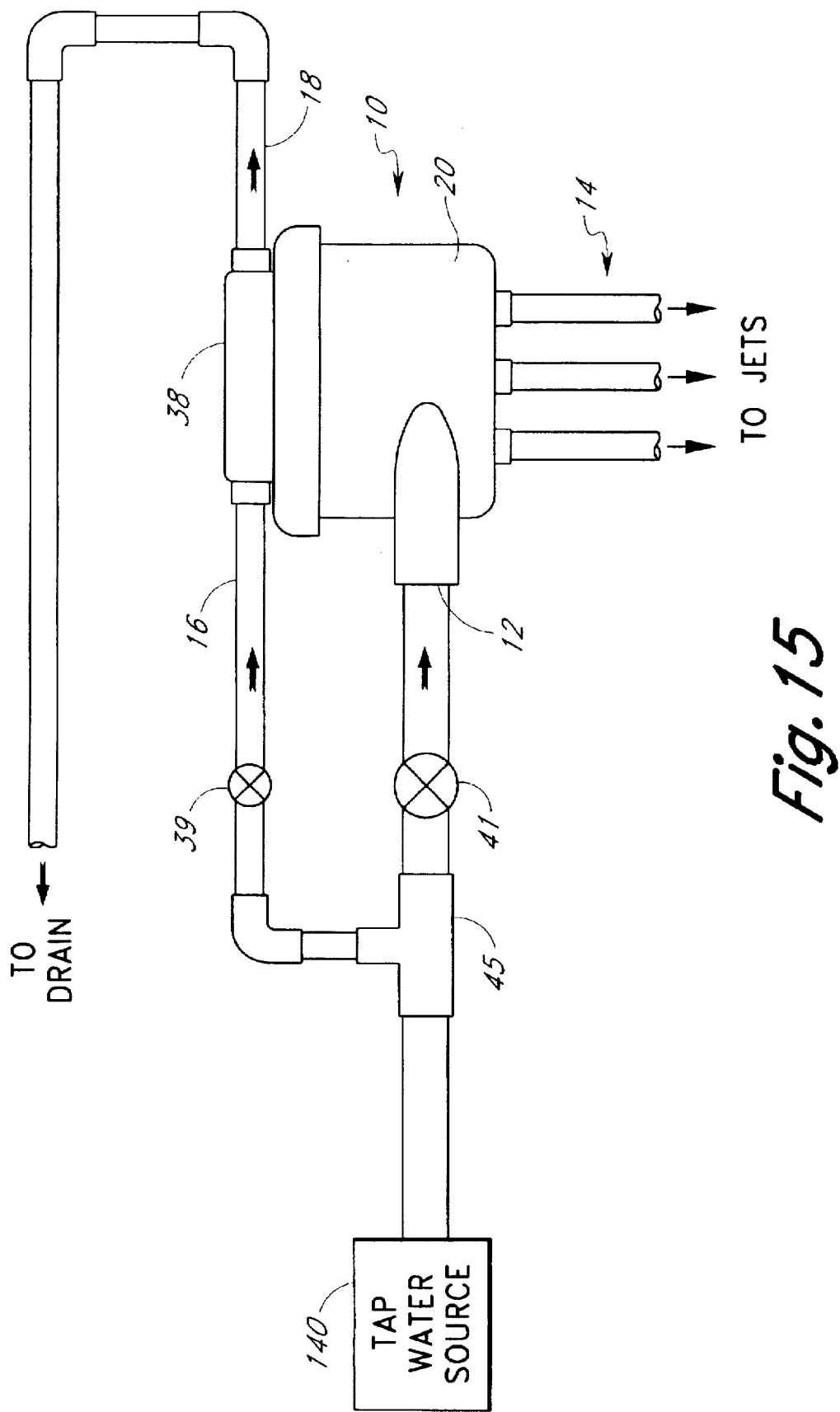
FIG. 15 illustrates generally the operating environment of the pulsing valve for cycling tap water.

In another alternate embodiment, the cycle valve may be connected to a tap water supply rather than a pressurized water supply as described above. By way of example, the operation the pulsing valve 10 described in association with FIGS. 1–6 above will be described in association with tap water operation in association with FIGS. 14–15. This embodiment is advantageous as it enables the pulsing valve 10 to be connected to a water jet or a plurality of water jets 24 arranged in an array 26 in a conventional bath tub 142 or shower (not shown) where a pressurized water supply may not be available. Advantageously, the hardware of the pulsing valve does not have to be altered to enable the operation of the valve using tap water instead of pressurized water, only the connections to the valve need to be altered. Further, the operation of the pulsing valve 10 is the same as in the pressurized water cycling operation described in association with FIGS. 1–11 above.

In the tap water cycling embodiment, the main water supply line 12 and the turbine water supply line 16 are connected to a conventional tap water source 140. As indicated above, the same tap water source 140 may be used to supply water to the main water supply line 12 and the turbine water supply line 16 or two different tap water source may be used. Also as indicated above, if the same tap water source 140 is used to supply water to the water turbine inlet line 16 and the valve's main water inlet line 12, the second valve 41 may be installed between the tap water source 140 and the valve's main water inlet line 12 to meter the pressure of the water delivered to the valve 10. When the same water source is used, a conventional three-way valve 45 is utilized to route a portion of the water from the tap water source 140 to the water turbine inlet line 16 or, in the case where the speed control valve 39 is used as shown in FIG. 13, a portion of the water is delivered to a water line that is connected to the speed control valve 39 which meters the water delivered to the water turbine inlet line 16. The remainder of the water from the tap water source 140 is delivered to the second valve 41. From the second valve 41, the water is supplied to the valve's main inlet supply line 12.

In either case, the power for the turbine 38 is provided by water flow from the tap water supply 140 through the water turbine inlet line 16 which is separate from the valve's main water inlet line 12. By powering the turbine utilizing water from the water turbine inlet line 16 for driving the turbine 38 instead of using the main supply line 12, the switching speed of the selector mechanism may be varied independently of the pressure of the water sent to the jets 24. In this embodiment, the speed control valve 39 may be provided in the water turbine inlet line 16 to vary the flow of the tap water delivered to the water turbine 38 as described above in association with the pressurized water cycling embodiment above to control the speed of the cycling or switching of the water output lines 14.

The operation of the valve using tap water is the same as the operation of the valve describe above in association with FIGS. 1–11, except that the valve 10 routes tap water instead of pressurized water to each of the outlet lines 14 in a periodic manner. The tap water from each of the outlet lines 14 from the valve 10 is preferably mixed with air from an air source 25 that is delivered by a plurality of air delivery lines 27 to each of the water jets 24 and is sent into the bathtub 142 as a water/air mixture. The water from the outlet 18 of the turbine 38 is sent down the drain (not shown) of the bath tub 142 or shower.

Having thus described the present invention, many modifications thereto will become apparent to those skilled in the art to which it pertains without departing from the scope and spirit of the present invention as defined in the appended claims.

What is claimed is:

1. A massaging apparatus for directing water flow to a selected part of an occupant of a whirlpool spa, said apparatus comprising:

a water supply;

an array of water jets for sequentially supplying streams of high-pressure water to said part of said occupant;

a multiplexing valve for sequentially directing water flow through said jets, said multiplexing valve comprising:
   a water turbine driven at a first torque to rotate at a first rate;

a first water inlet for supplying water to said water turbine;

a reduction gear assembly driven by said water turbine;
   a plurality of water outlets;

a second water inlet for supplying water to said outlets; and a selector mechanism driven by said reduction gear assembly at a second rate which is lower than said first rate but at a torque which is higher than said first torque to overcome seizure caused by water borne contaminants, said selector mechanism further including an opening, said opening allowing water from said second water inlet to pass into a selected one of said outlets;

a plurality of water outlet lines, each of said outlet lines connecting one of said water outlets to one of said water jets, said outlet lines permitting connection of said water jets in different configurations; and a diverter valve, having an input and an output end, said input end being connected to said water supply and said output end being connected to said second water inlet, said diverter valve permitting controlled metering of the flow of the water delivered to said first water inlet.

2. A method of assembling a hydrotherapy system on a bathtub, comprising:

connecting a water turbine to a first tap water supply through a first inlet, said water turbine including a gear reducer to increase a driving torque produced by the turbine;

supplying water through a second inlet to a multiplexing valve to route water from said tap water supply to each of a plurality of outlets;

rotating said multiplexing valve, using the increased driving torque;

positioning an array of water jets on said bathtub in a selected configuration;

routing water lines to connect each of said outlets to a respective one of said array of water jets;

supplying air to each of said water jets; and discharging a mixture of water and air from the array of water jets towards said occupant in a periodic manner.

3. A multiplexing valve powered by tap water for sequentially directing tap water to an array of water jets, said multiplexing valve comprising:

a water turbine driven at a first torque to rotate at a first rate;

a first water inlet for supplying tap water to said water turbine to produce said first torque;

a reduction gear assembly driven by said water turbine;

a second water inlet for supplying tap water to said valve;

a selector mechanism driven by said reduction gear assembly, said selector mechanism including at least one opening and a plurality of outlets, said at least one opening allowing tap water from said second water inlet to pass into a selected one of said plurality of outlets; and a plurality of outlet lines each connecting one of said plurality of outlets to one of said array of water jets, said outlet lines permitting connection of said outlets to water jets having different configurations.

4. A multiplexing valve for sequentially directing fluid to different configurations of arrays of jets, said multiplexing valve comprising:

a water turbine driven at a first rate;

a first inlet for supplying pressurized water to said turbine to produce said first torque;

a reduction gear assembly driven by said water turbine;

a plurality of outlets;

a second inlet for supplying a fluid to said valve;

a selector mechanism driven by said reduction gear assembly, said selector mechanism including at least one opening, said at least one opening allowing fluid from said fluid inlet to pass into a selected one of said outlets; and a plurality of outlet lines each connected to one of said outlets said outlet lines permitting connection of said multiplexing valve to said different configurations of arrays of jets.

5. The multiplexing valve connected to an array of jets for sequentially directing fluid to said jets of claim 4, wherein said fluid comprises pressurized water.

6. The multiplexing valve connected to an array of jets for sequentially directing fluid to said jets of claim 4, wherein said fluid comprises air.

7. The multiplexing valve connected to an array of jets for sequentially directing fluid to said jets of claim 4, wherein said fluid comprises tap water.

8. The multiplexing valve connected to an array of jets for sequentially directing fluid to said jets of claim 4, additionally comprising:

a distributing valve connected between and in fluid communication with said water inlet and said water turbine, said distributing valve metering the flow of the water delivered to said water turbine.

9. The massage apparatus of claim 1 additionally comprising a control valve for adjusting the speed of said water turbine independently of the water supplied to said second water inlet.

10. The method of claim 2 additionally comprising controlling the water pressure at said array of water jets independent of said first tap water supply.

11. The remote multiplexing valve of claim 4 additionally comprising a control valve for adjusting the speed of said water turbine independently of the water supplied to the second inlet.

* * * * *